(12) United States Patent
Kawato

(10) Patent No.: US 9,185,146 B2
(45) Date of Patent: Nov. 10, 2015

(54) SERVICE PROVIDING SYSTEM

(75) Inventor: Masahiro Kawato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 343 days.

(21) Appl. No.: 13/807,549

(22) PCT Filed: Apr. 20, 2011

(86) PCT No.: PCT/JP2011/002307
§ 371 (c)(1),
(2), (4) Date: Dec. 28, 2012

(87) PCT Pub. No.: WO2012/004916
PCT Pub. Date: Jan. 12, 2012

(65) Prior Publication Data
US 2013/0103802 A1    Apr. 25, 2013

(30) Foreign Application Priority Data

Jul. 9, 2010 (JP) ................. 2010-156280

(51) Int. Cl.
*G06F 15/16* (2006.01)
*H04L 29/06* (2006.01)
*H04L 29/08* (2006.01)

(52) U.S. Cl.
CPC ............ *H04L 65/40* (2013.01); *H04L 29/06* (2013.01); *H04L 29/08072* (2013.01); *H04L 63/0815* (2013.01); *H04L 67/306* (2013.01)

(58) Field of Classification Search
CPC .................... H04L 29/08072; H04L 29/06
USPC ........................................................ 709/217
See application file for complete search history.

(56) References Cited

U.S. PATENT DOCUMENTS

2007/0209041 A1*  9/2007  Exley et al. .................. 719/328
2008/0214311 A1*  9/2008  Saito et al. .................... 463/42

FOREIGN PATENT DOCUMENTS

JP    2008-65626 A    3/2008

OTHER PUBLICATIONS

"OpenID Authentication 2.1—Final", OpenID Foundation, Dec. 5, 2007, Section 3, 35 pgs.
"OAuth Core 1.0 Revision—a", OAuth Core Workgroup, Jun. 24, 2009, Section 6, 23 pgs.
International Search Report for PCT/JP2011/002307 dated May 24, 2011.

* cited by examiner

*Primary Examiner* — Chris Parry
*Assistant Examiner* — Weiwei Stiltner
(74) *Attorney, Agent, or Firm* — Sughrue Mion, PLLC

(57) ABSTRACT

A system 100 includes a first service providing part 110 for providing a first service, and a second service providing part 120 for providing a second service. The first service providing part 110 transmits a first individual ID that is associated with a common ID included in an ID information provision request and that is for identifying a user in the first service, to a user terminal. The second service providing part 120 receives a service ID for identifying the first service, the first individual ID and the common ID from the user terminal, and transmits the service ID and first individual ID having been received with the common ID associated with a second individual ID that is included in an ID information acquisition request and that is for identifying a user in the second service, to a user terminal.

6 Claims, 17 Drawing Sheets

Fig.5

| RECORD ID | COMMON ID | FIRST INDIVIDUAL ID |
|---|---|---|
| 1 | TanakaTaro | taro |
| 2 | SuzukiHanako | hanako |
| 3 | YamadaJiro | jiro |
| ⋮ | ⋮ | ⋮ |

Fig.6

| RECORD ID | COMMON ID | SECOND INDIVIDUAL ID | NAME | DATE OF BIRTH |
|---|---|---|---|---|
| 1 | TanakaTaro | tanaka | TARO TANAKA | 1980/2/5 |
| 2 | SuzukiHanako | suzuki | HANAKO SUZUKI | 1982/4/20 |
| 3 | YamadaJiro | yamada | JIRO YAMADA | 1972/9/12 |
| ... | ... | ... | ... | ... |

| RECORD ID | OWN INDIVIDUAL ID | EXTERNAL SERVICE ID | ANOTHER INDIVIDUAL ID |
|---|---|---|---|
| 1 | tanaka | sns | taro |
| 2 | suzuki | sns | hanako |
| 3 | suzuki | location | ellie |
| 4 | yamada | sns | jiro |
| ⋮ | ⋮ | ⋮ | ⋮ |

Fig.11

SERVICE blog ADDITION OF CORRESPONDENCE

USER ID    tanaka

SERVICE ID    sns

TRANSMIT

Fig.12

SERVICE sns PROVISION OF ID INFORMATION

USER ID    taro

SERVICE ID OF
PROVISION DESTINATION    blog

DO YOU APPROVE OF PROVISION OF THIS INFORMATION TO
ANOTHER SERVICE?

APPROVAL    DENIAL

Fig.17

| RECORD ID | OWN INDIVIDUAL ID | EXTERNAL SERVICE ID | ANOTHER INDIVIDUAL ID | TRANSMISSION PERMISSION ID |
|---|---|---|---|---|
| 1 | suzuki | sns | hanako | tanaka, yamada |
| 2 | tanaka | sns | taro | |
| 3 | yamada | sns | jiro | tanaka, suzuki |
| ... | ... | ... | ... | ... |

Fig.19

| RECORD ID | OWN INDIVIDUAL ID | EXTERNAL SERVICE ID | ANOTHER INDIVIDUAL ID | TRANSMISSION PERMISSION ID |
|---|---|---|---|---|
| 1 | suzuki | sns | hanako | tanaka, yamada |
| 2 | tanaka | sns | taro | suzuki, yamada |
| 3 | yamada | sns | jiro | tanaka, suzuki |
| ... | ... | ... | ... | ... |

Fig.20

| RECORD ID | OWN INDIVIDUAL ID | EXTERNAL SERVICE ID | ANOTHER INDIVIDUAL ID | TRANSMISSION PERMISSION ID |
|---|---|---|---|---|
| 1 | suzuki | sns | hanako | tanaka, yamada |
| 2 | tanaka | sns | taro | yamada |
| 3 | yamada | sns | jiro | tanaka, suzuki |
| ... | ... | ... | ... | ... |

SERVICE PROVIDING SYSTEM

CROSS REFERENCE TO RELATED APPLICATIONS

This application is a National Stage of International Application No. PCT/JP2011/002307 filed Apr. 20, 2011, claiming priority based on Japanese Patent Application No. 2010-156280 filed Jul. 9, 2010, the contents of all of which are incorporated herein by reference in their entirety.

TECHNICAL FIELD

The present invention relates to a service providing system configured to provide a plurality of services.

BACKGROUND ART

On a computer network like the Internet, services such as a social networking system (SNS) and a blog (a weblog) are popular.

In these services, each user using the service has a uniquely assigned ID (identifier) (i.e., an ID for identifying the user). Moreover, server devices providing these services each store profile information representing attributes (name, date of birth, preference, and so on) of each user in association with an ID assigned to the user.

In a case that each of the plurality of services issues an ID to a user independently from each other, different IDs depending on the respective services are assigned to a single user. In this case, there is a problem that a user using the plurality of services needs to use the plurality of IDs, respectively, and therefore it is less convenient. Moreover, there is a problem that other users cannot judge whether a user to whom a first ID is assigned in a first service is identical to a user to whom a second ID is assigned in a second service (i.e., cannot judge the identity of the users).

A technique to assign a common ID to a plurality of services (across a plurality of services) to a single user is called Single Sign On. As one of the techniques to realize Single Sign On, a distributed ID federation system is known. An example of this technique is OpenID described in Non-Patent Document 1.

FIG. 1 shows the outline of a procedure for confirming a user ID in OpenID. This procedure is described in "3. Protocol Overview" of Non-Patent Document 1.

Single Sign On in OpenID is configured by a user terminal (referred to as a User-agent in OpenID) operated by a user, a service provider (referred to as a Relying Party (RP) in OpenID), and an ID Provider (referred to as an OpenID provider (OP) in OpenID).

In OpenID, the following processes of steps 1 to 7 are executed.

Step 1: A user terminal is connected to an RP, and presents an ID called a user-supplied identifier to the RP. Typically, a user-supplied identifier includes a URL (Uniform Resource Locator) for specifying an OP having issued the user-supplied identifier.

Step 2: The RP specifies the URL of the OP based on the user-supplied identifier presented at step 1.

Step 3: The OP and the RP exchange a common key used for electronic signature with each other.

Step 4: The connection destination of the user terminal is switched (e.g., redirected) from the RP to the OP. At this moment, an OpenID authentication request issued by the RP is transmitted to the OP via the user terminal.

Step 5: Through the user terminal, an authentication process is executed between the user and the OP. An authenticating means is not included in the specification of OpenID. Typically, the authentication process is a process of confirming whether a combination of an ID (claimed identifier) and a password presented by the user matches a combination of an ID and a password previously registered into the OP. In response to the OpenID authentication request, the OP transmits information in which an electronic signature generated by using the common key exchanged at step 3 is added to information (assertion) representing success of authentication, to the user terminal.

Step 6: The connection destination of the user terminal is switched from the OP to the RP again. At this moment, the user terminal transmits a combination of the assertion issued at step 5 and the electronic signature to the RP.

Step 7: The user terminal transmits the encrypted assertion accepted at step 5 to the RP. The RP verifies the result of the authentication by decoding the electronic signature by using the common key exchanged at step 3.

Thus, by using the technique of Single Sign On such as OpenID, a user can utilize a plurality of services by using the same ID.

However, in a case that a common ID to a plurality of services is used, the attributes of a user (i.e., personal information) and privacy information like the history of usage of the services that are possessed by the providers of the respective services can be related among the services. Therefore, there is a fear that personal information and privacy information are disseminated beyond the intent of the user.

In order to solve this kind of problem in the case of using OpenID, there is a known operation method of registering a single user ID (a common ID; referred to as OP-Local Identifier in OpenID) and a password into the OP and issuing a different user ID (an individual ID; Claimed Identifier) depending on each service.

Further, as another technique for realizing Single Sign On, an access authority delegation system is known. One example of this technique is OAuth described in Non-Patent Document 2.

OAuth is a protocol for, by using the authority of a user on a certain service (a service provider), accessing information (resource) possessed by the service provider from another service (a consumer). At this moment, the user does not need to disclose either the user ID or the password directly to the consumer, so that Single Sign On is realized.

FIG. 2 shows the outline of an operation procedure of OAuth.

In prior to the following operation procedure, a consumer possesses a combination of an ID called a consumer key and a password called a consumer secret issued by a service provider.

Step 1: A user performs a predetermined operation to the consumer. This step is outside the range of the OAuth protocol. Typically, this operation is an operation that the user instructs to associate user information registered to the service provider with the consumer.

Step 2: The consumer requests the service provider to issue a request token (transmits a request token acquisition request). A request token is an identifier for identifying a request token acquisition request. The request token acquisition request includes a signature issued by using the consumer key and the consumer secret. In response to the request token acquisition request, the service provider transmits a request token to the consumer.

Step 3: The user performs an operation of authorization (permission) with respect to the request token for the service provider.

Step 4: The consumer requests the service provider to issue an access token corresponding to the request token. An access token is a temporary identifier which is necessary when the consumer accesses the service provider. In a case that the user has succeeded in authorization at step 3, the service provider transmits the access token to the consumer.

Step 5: The consumer accesses the resource possessed by the service provider (acquires the information) by using the access token acquired at step 4.

In the case of using OAuth, it is possible to judge the identity of a user across a plurality of services. This is because a consumer can refer to a user ID on a service provider by using delegated user authority, and therefore, it is possible to judge whether a specific user ID on the consumer and the user ID on the service provider are assigned to the same user.

[Non-Patent Document 1] "OpenID Authentication 2.0—Final," OpenID Foundation, Dec. 5, 2007, Section 3

[Non-Patent Document 2] "OAuth Core 1.0 Revision—a," OAuth Core Workgroup, Jun. 24, 2009, Section 6

As described above, in a case that different user IDs (individual IDs) depending on the respective services are used in OpenID, there is a problem that other users cannot judge whether a user to whom a first individual ID is assigned in a first service is identical to a user to whom a second individual ID is assigned in a second service (i.e., cannot judge the identity of the users).

Further, in OAuth, there is a problem that, in order to prevent the abuse of the authority of a user by an external service, there is a need to previously transmit a consumer key and a consumer secret issued by a service provider to a consumer.

That is to say, in the abovementioned techniques, there is a problem that it is impossible to cause other users to judge the identity of a user to whom a different ID depending on each of a plurality of services is assigned, without previously performing a process of causing a service provider to issue a consumer key and a consumer secret and also transmitting them to a consumer.

SUMMARY

Accordingly, an object of the present invention is to provide a service providing system capable of solving the aforementioned problem, "it is impossible to cause other users to judge the identity of a user to whom a different ID depending on each of a plurality of services is assigned, without previously performing a process."

In order to achieve the object, a service providing system as an exemplary embodiment of the present invention includes:

a first service providing means for providing a first service by executing a first application program; and a second service providing means for providing a second service by executing a second application program.

The first service providing means includes:

an ID information provision request receiving means for receiving, from a user terminal, an ID information provision request including a common ID that is information common to the first service and the second service and that is information for identifying a user; and an individual ID transmitting means for transmitting, to the user terminal having transmitted the ID information provision request, a first individual ID that is information associated with the common ID included in the ID information provision request and that is information for identifying a user in the first service.

The second service providing means includes:

an ID information receiving means for receiving, from the user terminal, a service ID that is information for identifying the first service, the first individual ID, and the common ID;

an ID information acquisition request receiving means for receiving, from a user terminal, an ID information acquisition request including a second individual ID that is information for identifying a user in the second service; and an ID information transmitting means for transmitting, to the user terminal having transmitted the ID information acquisition request, the service ID and the first individual ID that have been received with the common ID associated with the second individual ID included in the ID information acquisition request.

Further, a service providing method as another exemplary embodiment of the present invention is a method applied to a service providing system configured to provide a first service by executing a first application program and provide a second service by executing a second application program.

The service providing method includes:

receiving, from a user terminal, an ID information provision request including a common ID that is information common to the first service and the second service and that is information for identifying a user;

transmitting, to the user terminal having transmitted the ID information provision request, a first individual ID that is information associated with the common ID included in the ID information provision request and that is information for identifying a user in the first service;

receiving, from the user terminal, a service ID that is information for identifying the first service, the first individual ID, and the common ID;

receiving, from a user terminal, an ID information acquisition request including a second individual ID that is information for identifying a user in the second service; and transmitting, to the user terminal having transmitted the ID information acquisition request, the service ID and the first individual ID that have been received with the common ID associated with the second individual ID included in the ID information acquisition request.

Further, an ID provision server device as another exemplary embodiment of the present invention is a device configured to provide a first service by executing a first application program.

Furthermore, this ID provision server device includes:

an ID information provision request receiving means for receiving, from a user terminal, an ID information provision request including a common ID that is information common to the first service and a second service provided by an ID acquisition server device and that is information for identifying a user; and an individual ID transmitting means for transmitting, to the user terminal having transmitted the ID information provision request, a first individual ID that is information associated with the common ID included in the ID information provision request and that is information for identifying a user in the first service.

Further, an ID provision program as another exemplary embodiment of the present invention is a program comprising instructions for causing an information processing device configured to provide a first service by executing a first application program, to realize;

an ID information provision request receiving means for receiving, from a user terminal, an ID information provision request including a common ID that is information common to the first service and a second service provided by an ID acquisition server device and that is information for identifying a user; and an individual ID transmitting means for transmitting, to the user terminal having transmitted the ID information provision request, a first individual ID that is information associated with the common ID included in the ID information provision request and that is information for identifying a user in the first service.

Further, an ID acquisition server device as another exemplary embodiment of the present invention is a device configured to provide a second service by executing a second application program.

Furthermore, this ID acquisition server device includes:

an ID information receiving means for receiving, from a user terminal, a service ID that is information for identifying a first service provided by an ID provision server device, a first individual ID that is information for identifying a user in the first service, and a common ID that is information common to the first service and the second service and that is information for identifying a user;

an ID information acquisition request receiving means for receiving, from a user terminal, an ID information acquisition request including a second individual ID that is information for identifying a user in the second service; and an ID information transmitting means for transmitting, to the user terminal having transmitted the ID information acquisition request, the service ID and the first individual ID that have been received with the common ID associated with the second individual ID included in the ID information acquisition request.

Further, an ID acquisition program as another exemplary embodiment of the present invention is a program comprising instructions for causing an information processing device configured to provide a second service by executing a second application program, to realize:

an ID information receiving means for receiving, from a user terminal, a service ID that is information for identifying a first service provided by an ID provision server device, a first individual ID that is information for identifying a user in the first service, and a common ID that is information common to the first service and the second service and that is information for identifying a user;

an ID information acquisition request receiving means for receiving, from a user terminal, an ID information acquisition request including a second individual ID that is information for identifying a user in the second service; and an ID information transmitting means for transmitting, to the user terminal having transmitted the ID information acquisition request, the service ID and the first individual ID that have been received with the common ID associated with the second individual ID included in the ID information acquisition request.

By the abovementioned configurations, the present invention makes it possible to cause other users to judge the identity of a user to whom a different ID depending on each of a plurality of services is assigned, without previously performing a process.

BRIEF DESCRIPTION OF DRAWINGS

FIG. 5 is a table which is stored by an ID provision server device according to the first exemplary embodiment of the present invention, and which includes a record composed of a record ID, a common ID and a first individual ID;

FIG. 6 is a table which is stored by an ID acquisition server device according to the first exemplary embodiment of the present invention, and which includes a record composed of a record ID, a common ID, a second individual ID, a name and a date of birth;

FIG. 11 is a view showing a screen that the first user terminal according to the first exemplary embodiment of the present invention causes the display to display based on correspondence adding screen information;

FIG. 12 is a view showing a screen that the first user terminal according to the first exemplary embodiment of the present invention causes the display to display based on approval screen information;

FIG. 17 is a table which is stored by an ID acquisition server device according to the second exemplary embodiment of the present invention, and which includes a record composed of a record ID, an own individual ID, an external service ID, another individual ID and a transmission permission ID;

FIG. 19 is a table which is stored by the ID acquisition server device according to the second exemplary embodiment of the present invention, and which includes a record composed of a record ID, an own individual ID, an external service ID, another individual ID and a transmission permission ID;

FIG. 20 is a table which is stored by the ID acquisition server device according to the second exemplary embodiment of the present invention, and which includes a record composed of a record ID, an own individual ID, an external service ID, another individual ID and a transmission permission ID.

EXEMPLARY EMBODIMENTS

Below, the respective exemplary embodiments of a service providing system, a service providing method, an ID provision server device, an ID provision program, an ID acquisition server device and an ID acquiring program according to the present invention will be described with reference to FIGS. 1 to 21.

First Exemplary Embodiment

Configuration

Figure 1:
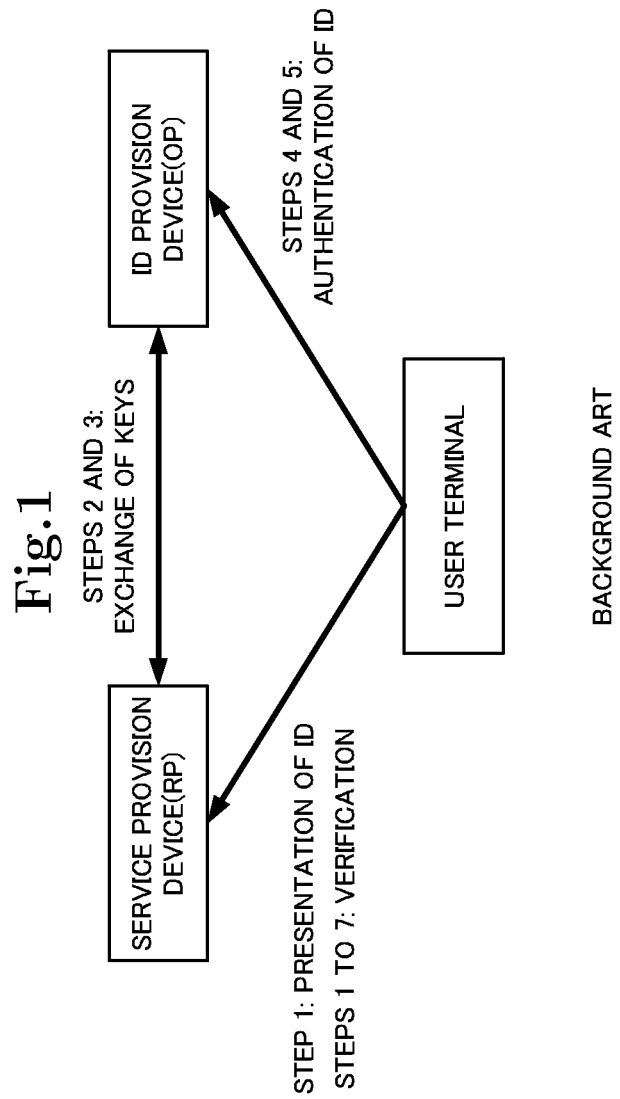
FIG. 1 is an explanation view conceptually showing the outline of a procedure for confirming a user ID in OpenID.
Figure 2:
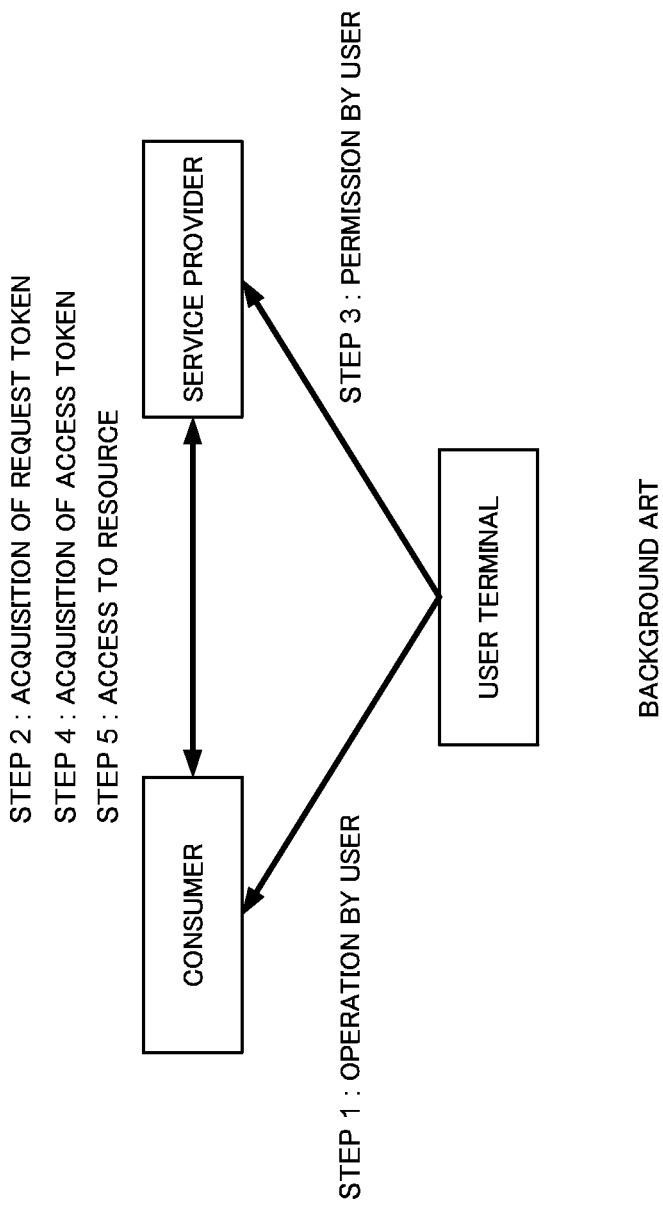
FIG. 2 is an explanation view conceptually showing the outline of a procedure of an operation of OAuth.
Figure 3:
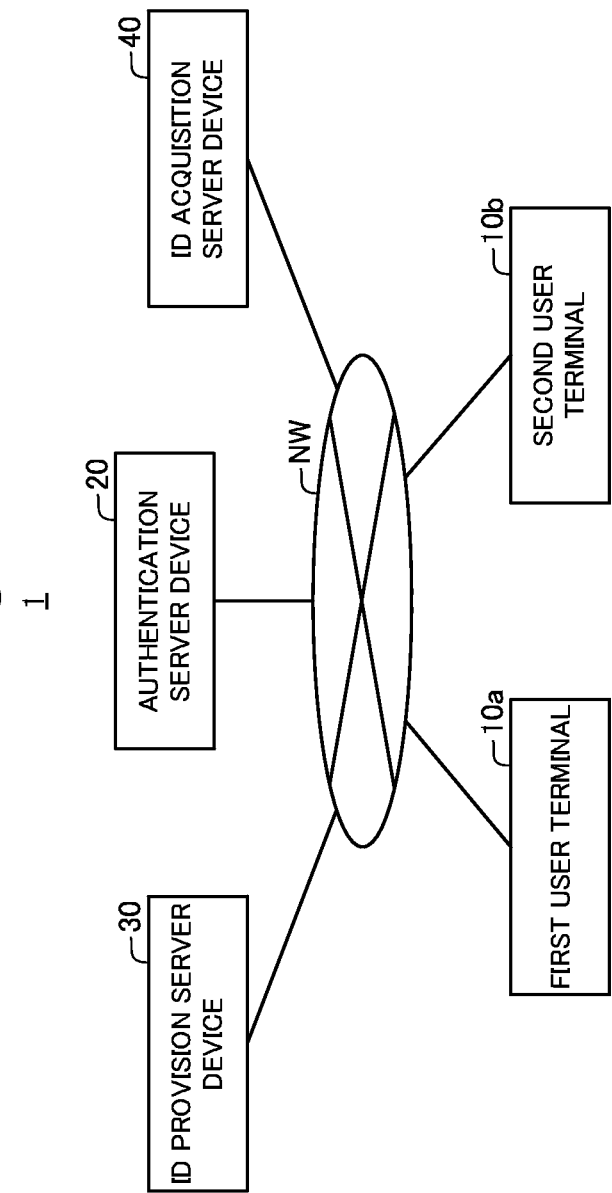
FIG. 3 is a schematic diagram showing a configuration of an information processing system according to a first exemplary embodiment of the present invention.

As shown in FIG. 3, an information processing system 1 according to a first exemplary embodiment includes a plurality of user terminals (in this exemplary embodiment, a first user terminal 10a and a second user terminal 10b), an authentication server device 20, an ID provision server device (a first service providing means) 30, and an ID acquisition server device (a second service providing means) 40.

Further, the first user terminal 10a, the second user terminal 10b, the authentication server device 20, the ID provision server device 30, and the ID acquisition server device 40 are connected, respectively, so as to be capable of communicating with each other via a communication network NW configuring an IP (Internet Protocol) network.

Each of the user terminals 10a and 10b is a personal computer. Each of the user terminals 10a and 10b may be a mobile telephone terminal, a PHS (Personal Handyphone System), a PDA (Personal Data Assistance, Personal Digital Assistant), a car navigation terminal, a game terminal, or the like.

Each of the user terminals 10a and 10b is equipped with a CPU (Central Processing Unit), a storage device (a memory and a hard disk drive (HDD)), an input device (a keyboard, a touch screen, a mouse, and the like), and an output device (a display, and the like), which are not shown in the drawings.

Each of the user terminals 10a and 10b is configured to realize a function described later by execution of a program stored in the storage device by the CPU.

Each of the authentication server device 20, the ID provision server device 30 and the ID acquisition server device 40 (i.e., each of the server devices 20 to 40) is an information processing device. Each of the server devices 20 to 40 is equipped with a CPU and a storage device, which are not shown in the drawings. Each of the server devices 20 to 40 is configured to realize a function described later by execution of a program stored in the storage device by the CPU.

The ID provision server device 30 and the ID acquisition server device 40 configure a service providing system. Moreover, the service providing system may be equipped with a plurality of ID provision server devices. Moreover, the service providing system may be equipped with a plurality of ID acquisition server devices.

Further, the service providing system may be equipped with one server device having a function of the ID provision server device 30 and a function of the ID acquisition service device 40, instead of the ID provision server device 30 and the ID acquisition server device 40.

Further, the information processing system 1 may be equipped with one user terminal used by a plurality of different users, instead of the plurality of user terminals.

(Function)

Figure 4:
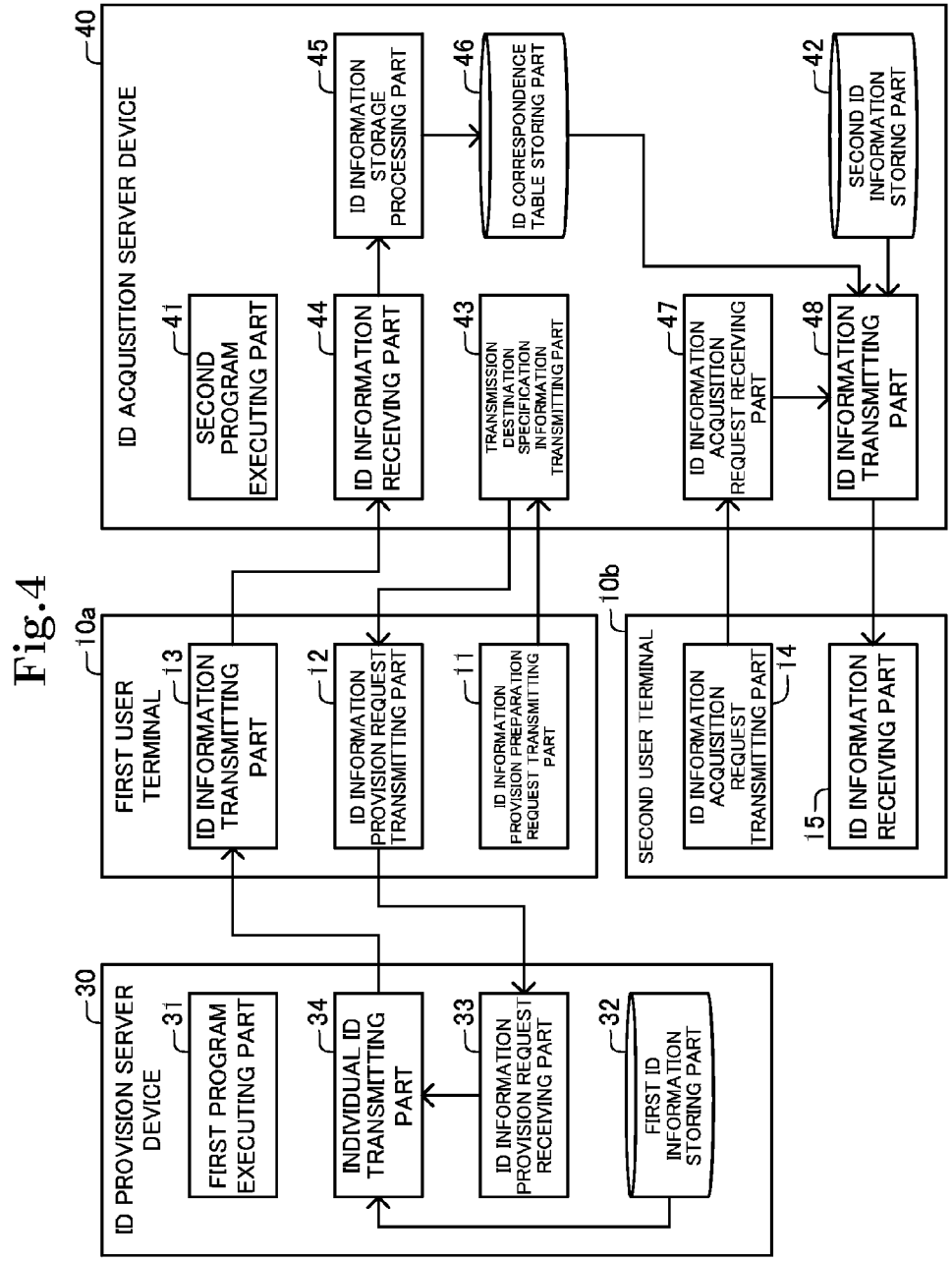
FIG. 4 is a schematic block diagram showing a function of the information processing system according to the first exemplary embodiment of the present invention.

FIG. 4 is a block diagram showing a function of the information processing system 1 configured as described above.

A function of the first user terminal 10a includes an ID information provision preparation request transmitting part (an ID information provision preparation request transmitting means) 11, an ID information provision request transmitting part (an ID information provision request transmitting means) 12, and an ID information transmitting part (an ID information transmitting means) 13.

A function of the second user terminal 10b includes an ID information acquisition request transmitting part (an ID information acquisition request transmitting means) 14, and an ID information receiving part (an ID information receiving means) 15.

The function of the first user terminal 10a may further include the ID information acquisition request transmitting part 14 and the ID information receiving part 15. Moreover, the function of the second user terminal 10b may further include the ID information provision preparation request transmitting part 11, the ID information provision request transmitting part 12, and the ID information transmitting part 13.

A function of the ID provision server device 30 includes a first program executing part (a first program executing means) 31, a first ID information storing part (a first ID information storing means) 32, an ID information provision request receiving part (an ID information provision request receiving means) 33, and an individual ID transmitting part (an individual ID transmitting means) 34.

A function of the ID acquisition server device 40 includes a second program executing part (a second program executing means) 41, a second ID information storing part (a second ID information storing means) 42, a transmission destination specification information transmitting part (a transmission destination specification information transmitting means) 43, an ID information receiving part (an ID information receiving means) 44, an ID information storage processing part (an ID information storage processing means) 45, an ID correspondence table storing part (an ID correspondence table storing means) 46, an ID information acquisition request receiving part (an ID information acquisition request receiving means) 47, and an ID information transmitting part (an ID information transmitting means) 48.

The first program executing part 31 of the ID provision server device 30 provides a first service by executing a first application program. In this exemplary embodiment, the first service is SNS. The first program executing part 31 stores a private key unique to the first service, and a public key certificate corresponding to the private key. The public key certificate is information issued by an external certificate authority. The service providing system previously sets "sns" as a service ID (an application name) for identifying the first service.

Likewise, the second program executing part 41 of the ID acquisition server device 40 provides a second service by executing a second application program. In this exemplary embodiment, the second service is a blog. The second program executing part 41 stores a private key unique to the second service, and a public key certificate corresponding to the private key. The service providing system previously sets "blog" as a service ID (an application name) for identifying the second service.

Further, the first ID information storing part 32 of the ID provision server device 30 stores a common ID and a first individual ID in association with each other. A common ID is information which is common to a plurality of services (in this exemplary embodiment, the first service and the second service) provided by the service providing system and which is for identifying a user. In this exemplary embodiment, a common ID is information issued (generated) by the authentication server device 20. Moreover, a first individual ID is information for identifying a user in the first service.

In this exemplary embodiment, the first ID information storing part 32 stores a plurality of records each composed of a record ID, a common ID and a first individual ID as shown in FIG. 5. A record ID is information for identifying a record. A record may include information (profile information) representing the attributes (e.g., name, date of birth, gender, height, weight, and so on) of a user.

Likewise, the second ID information storing part 42 of the ID acquisition server device 40 stores a common ID and a second individual ID in association with each other. A second individual ID is information for identifying a user in the second service.

In this exemplary embodiment, the second ID information storing part 42 stores a plurality of records each composed of a record ID, a common ID, a second individual ID, a name and a date of birth as shown in FIG. 6. A record does not need to necessarily include a name and a date of birth. A record may include information (profile information) representing the attributes (e.g., gender, height, weight, and so on) of a user other than a name and a date of birth.

In a case that a service ID (in this exemplary embodiment, "sns") is inputted by a user of the first user terminal 10*a* in a state that the user is authenticated as a valid user by the authentication server device 20, the ID information provision preparation request transmitting part 11 of the first user terminal 10*a* transmits a request for ID information provision preparation including the service ID to the ID acquisition server device 40.

The transmission destination specification information transmitting part 43 of the ID acquisition server device 40 receives a request for ID information provision preparation from the first user terminal 10*a*. When receiving the request for ID information provision preparation, the transmission destination specification information transmitting part 43 transmits transmission destination specification information for specifying a destination for transmission of an ID information provision request, associated with a service (in this exemplary embodiment, the first service) identified by a service ID included in the request for ID information provision preparation, to the first user terminal 10*a*. That is to say, in this exemplary embodiment, transmission destination specification information includes information for specifying the ID provision server device 30 as a destination for transmission of an ID information provision request.

The ID information provision request transmitting part 12 of the first user terminal 10*a* receives transmission destination specification information from the ID acquisition server device 40. When receiving the transmission destination specification information, the ID information provision request transmitting part 12 transmits an ID information provision request to a transmission destination (in this exemplary embodiment, the ID provision server device 30) specified by the transmission destination specification information. An ID information provision request includes a common ID for identifying the user of the first user terminal 10*a*, and a service ID (in this exemplary embodiment, "blog") for identifying a service to which ID information is provided.

The ID information provision request receiving part 33 of the ID provision server device 30 receives an ID information provision request from the first user terminal 10*a*.

The individual ID transmitting part 34 of the ID provision server device 30 transmits a first individual ID to the user terminal (in this exemplary embodiment, the first user terminal 10*a*) having transmitted the ID information provision request. The first individual ID transmitted by the individual ID transmitting part 34 is a first individual ID stored in the first ID information storing part 32 in association with a common ID included in the ID information provision request.

The ID information transmitting part 13 of the first user terminal 10*a* receives a first individual ID from the ID provision server device 30. When receiving the first individual ID, the ID information transmitting part 13 transmits (transfers) the first individual ID, the common ID for identifying the user of the first user terminal 10*a*, and the service ID as information for identifying the first service, to a destination for transmission (in this exemplary embodiment, the ID acquisition server device 40) of the request for ID information provision preparation.

The ID information receiving part 44 of the ID acquisition server device 40 receives the service ID, the first individual ID, and the common ID from the first user terminal 10*a*.

The ID information storage processing part 45 of the ID acquisition server device 40 causes the ID correspondence table storing part 46 to store the service ID and first individual ID received by the ID information receiving part 44 and a second individual ID stored in the second ID information storing part 42 in association with the common ID received by the ID information receiving part 44, in association with each other.

In this exemplary embodiment, the ID information storage processing part 45 causes the ID correspondence table storing part 46 to store an external service ID (in this exemplary embodiment, "sns") that is the service ID received by the ID information receiving part 44, another individual ID that is the first individual ID received by the ID information receiving part 44, and an own individual ID that is the second individual ID associated with the common ID received by the ID information receiving part 44, in association with each other.

Figures 7, 8:
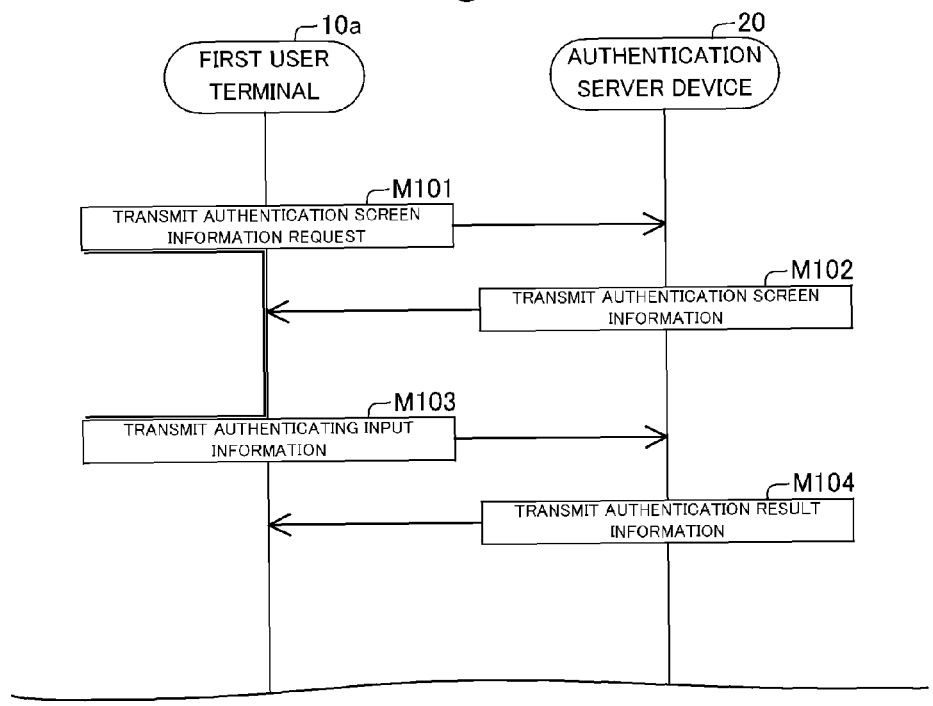
FIG. 7 is a table which is stored by the ID provision server device according to the first exemplary embodiment of the present invention, and which includes a record composed of a record ID, an own individual ID, an external service ID and another individual ID.
FIG. 8 is a sequence diagram showing an operation of the information processing system according to the first exemplary embodiment of the present invention, the operation relating to a user authentication process.

In this exemplary embodiment, the ID correspondence table storing part 46 of the ID acquisition server device 40 stores a plurality of records each composed of a record ID, an own individual ID, an external service ID and another individual ID as shown in FIG. 7. Among the records shown in FIG. 7, a record whose record ID is "2" represents that a user identified by an own individual ID "suzuki" (the second individual ID) in an own service (in this exemplary embodiment, the second service) is identified by another individual ID "hanako" (the first individual ID) in the first service "sns" as an external service.

Further, as described above, the second ID information storing part 42 stores a common ID and a second individual ID in association with each other. Therefore, it is also possible to say that the storage device stores a service ID, first individual ID and common ID received by the ID information receiving part 44, in association with each other.

In a case that a second individual ID is inputted by a user of the second user terminal 10*b* in a state that the user is authenticated as a valid user by the authentication server device 20, the ID information acquisition request transmitting part 14 of the second user terminal 10b transmits an ID information acquisition request including the second individual ID to the ID acquisition server device 40.

The ID information acquisition request receiving part 47 of the ID acquisition server device 40 receives the ID information acquisition request from the second user terminal 10b.

The ID information transmitting part 48 of the ID acquisition server device 40 transmits ID information to the user terminal (in this exemplary embodiment, the second user terminal 10b) having transmitted the ID information acquisition request received by the ID information acquisition request receiving part 47.

ID information includes a service ID (an external service ID) and a first individual ID (another individual ID) that are included in a record including the same own individual ID as the second individual ID included in the ID information acquisition request, among the records stored in the ID correspondence table storing part 46.

That is to say, it is also possible to say that ID information includes a service ID and a first individual ID that are stored in the ID correspondence table storing part 46 in association with the same second individual ID as the second individual ID included in the ID information acquisition request. Moreover, it is also possible to say that ID information includes a service ID and a first individual ID that have been received with a common ID stored in the second ID information storing part 42 in association with the second individual ID included in the ID information acquisition request.

The ID information receiving part 15 of the second user terminal 10b receives the ID information from the ID acquisition server device 40. The ID information receiving part 15 outputs the received ID information via the output device.

Further, a function of the authentication server device 20 includes a function of issuing a common ID to the user of the service providing system and executing an authentication process based on a common ID and a password received from the user terminal 10a, 10b. The authentication process is a process of judging whether the received common ID and password match previously stored information.

The function of the authentication server device 20 includes a function of transmitting authentication success information representing success of the authentication process, to the user terminals 10a and 10b, in a case that the received common ID and password are judged to match previously stored information.

(Operation)

Next, an operation of the aforementioned information processing system 1 will be described.

The outline of the operation will be described at first, and the details of the operation will be described later.

<Outline of Operation>

The operation of the information processing system 1 majorly includes operations for executing the following three processes:
1. a user authentication process;
2. an individual ID information registration process; and
3. an ID information acquisition process.

The user authentication process is a process which is executed in prior to the two other processes and which is for judging whether a user of each of the user terminals 10a and 10b is a valid user. The user authentication process is a process executed between each of the user terminals 10a and 10b and the authentication server device 20.

The individual ID information registration process is a process of registering an individual ID of a user in one service (in this exemplary embodiment, the first individual ID in the first service) into another service (the second service). The individual ID information registration process is a process executed between each of the user terminals 10a and 10b, and the ID provision server device 30 and the ID acquisition server device 40, respectively.

The ID information acquisition process is a process of outputting an individual ID (in this exemplary embodiment, the first individual ID) possessed by one user in one service (in this exemplary embodiment, the first service) to another user. The ID information acquisition process is a process executed between each of the user terminals 10a and 10b and the ID acquisition server device 40.

<Details of Operation>

<<User Authentication Process>>

With reference to a sequence diagram of FIG. 8, the operation of the information processing system for the user authentication process will be described.

At first, the first user terminal 10a transmits an authentication screen information request to the authentication server device 20 in accordance with information inputted by the user (step M101). Upon reception of the authentication screen information request from the first user terminal 10a, the authentication server device 20 transmits authentication screen information representing an authentication screen, to the first user terminal 10a (step M102).

Figure 9:
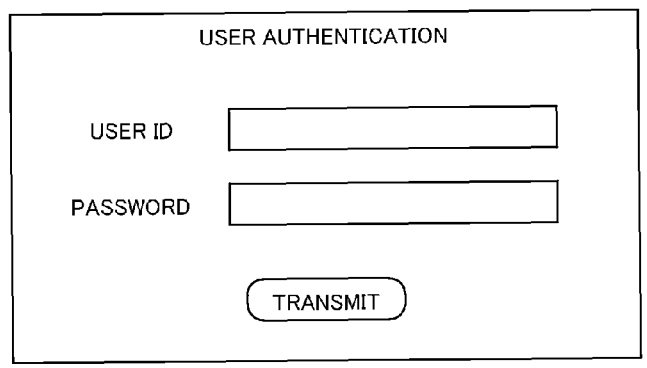
FIG. 9 is a view showing a screen that a first user terminal according to the first exemplary embodiment of the present invention causes a display to display based on authentication screen information.

Thus, the first user terminal 10a receives the authentication screen information, and causes the display to display a screen (an image) shown in FIG. 9 based on the received authentication screen information. Then, the user of the first user terminal 10a inputs a common ID as a user ID and a password into the first user terminal 10a.

Thus, the first user terminal 10a transmits authenticating input information including the common ID and password inputted by the user, to the authentication server device 20 (step M103). In order to prevent wiretapping (leakage) of passwords, the information processing system 1 may be configured to use a technique such as challenge-response authentication, instead of transmission of passwords as they are.

The authentication server device 20 executes an authentication process based on the common ID and password received from the first user terminal 10a. That is to say, the authentication server device 20 judges whether the received common ID and password match information previously stored therein. Then, in a case that the received common ID and password are judged to match the previously stored information, the authentication server device 20 transmits authentication success information representing success of the authentication process as authentication result information to the first user terminal 10a (step M104).

In this exemplary embodiment, the authentication success information includes the common ID, validity information representing the validity of the common ID, and a signature (a digital signature). The authentication success information may include an expiration date.

The signature is information based on a public key infrastructure (PKI). That is to say, the authentication server device 20 previously stores a private key unique to the authentication server device 20 and a public key certificate corresponding to the private key. The authentication server device 20 generates, as the signature, information obtained by calculating a hash value by applying a hash function to the validity information and encrypting the calculated hash value by using the private key. For example, the hash function is a function according to MD5 (Message Digest Algorithm 5), SHA (Secure Hash Algorithm), or the like.

In each of the subsequent processes, when transmitting a request or information to the ID provision server device 30 or the ID acquisition server device 40, the first user terminal 10a adds the authentication success information to the request or the information. Further, each of the ID provision server device 30 and the ID acquisition server device 40 decrypts the signature included in the received authentication success information by using the public key of the authentication server device 20.

Furthermore, each of the ID provision server device 30 and the ID acquisition server device 40 calculates a hash value by applying a hash function to the validity information included in the authentication success information. In addition, each of the ID provision server device 30 and the ID acquisition server device 40 verifies the validity of the authentication success information by comparing the calculated hash value with the decrypted signature.

The second user terminal 10b also executes the user authentication process in the same manner as the first user terminal.

<<Individual ID Information Registration Process>>

Figure 10:
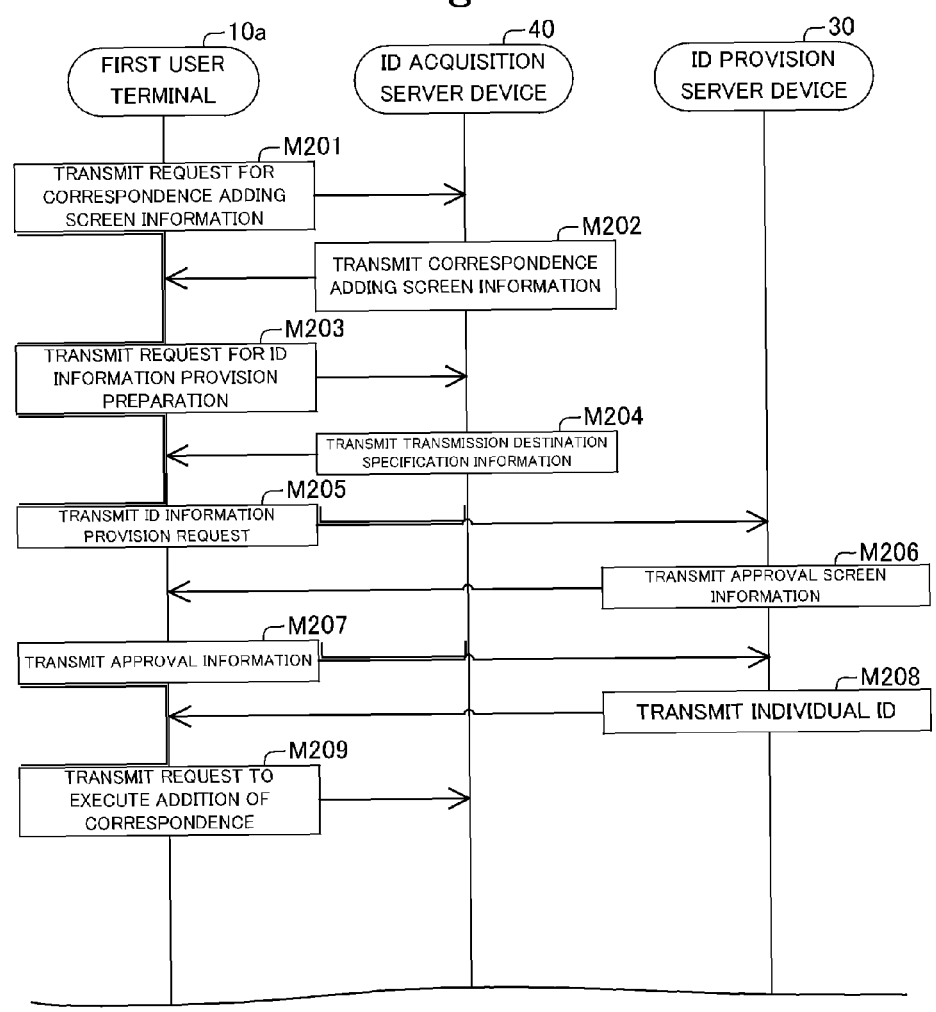
FIG. 10 is a sequence diagram showing an operation of the information processing system according to the first exemplary embodiment of the present invention, the operation relating to an individual ID information registration process.

With reference to a sequence diagram of FIG. 10, the operation of the information processing system 1 for the individual ID information registration process will be described.

At first, the first user terminal 10a transmits a request for correspondence adding screen information to the ID acquisition server device 40 in accordance with information inputted by the user (step M201). As described above, the first user terminal 10a transmits a request for correspondence adding screen information, to which request the authentication success information generated by the authentication server device 20 is added. Moreover, the ID acquisition server device 40 verifies the validity of the received authentication success information.

Likewise, at steps M203, M205, M207 and M209 described later, the first user terminal 10a also transmits a request or information to which the authentication success information is added.

Then, upon reception of the request for correspondence adding screen information from the first user terminal 10a, the ID acquisition server device 40 transmits correspondence adding screen information that represents a correspondence adding screen including a service ID entry field and a transmission button, to the first user terminal 10a (step M202). The entry field may be, for example, a pull-down menu for causing the user to choose from among a plurality of choices. Moreover, instead of the transmission button, a hyperlink may be used. Moreover, the information may be transmitted when a specific key is inputted.

Next, the first user terminal 10a receives the correspondence adding screen information, and causes the display to display a screen (an image) shown in FIG. 11 based on the received correspondence adding screen information. In this exemplary embodiment, the screen shows that a service ID of a service (the second service) provided by the ID acquisition server device 40 is "blog" and an individual ID (the second individual ID) in the service is "tanaka."

Then, the user of the first user terminal 10a inputs a service ID (in this exemplary embodiment, "sns") into the first user terminal 10a. Moreover, the user of the first user terminal 10a performs an operation of pressing down the transmission button. Thus, the first user terminal 10a transmits a request for ID information provision preparation, to the ID acquisition server device 40 (step M203). The request for ID information provision preparation includes the service ID inputted by the user.

Upon reception of the request for ID information provision preparation, the ID acquisition server device 40 transmits transmission destination specification information for specifying a destination for transmission of an ID information provision request, associated with a service (in this exemplary embodiment, the first service) identified by the service ID included in the request for ID information provision preparation, to the first user terminal 10a (step S204).

In this exemplary embodiment, the transmission destination specification information includes information for specifying the ID provision server device 30 as a destination for transmission of the ID information provision request. Moreover, in this exemplary embodiment, the transmission destination specification information includes a status code representing HTTP Redirection, and URL (Uniform Resource Locator).

Upon reception of the transmission destination specification information, the first user terminal 10a transmits an ID information provision request to a transmission destination (in this exemplary embodiment, the ID provision server device 30) specified by the transmission destination specification information (M205). The ID information provision request includes a common ID for identifying the user of the first user terminal 10a, and a service ID (in this exemplary embodiment, "blog") for identifying a service as a destination for provision of ID information.

Upon reception of the ID information provision request, the ID provision server device 30 transmits, to the first user terminal 10a, approval screen information representing a screen including an individual ID (the first individual ID) in the first service, the service ID of the first service, an approval button, and a denial button. Instead of the approval button and the denial button, hyperlinks may be used. Moreover, the information may be transmitted when a specific key is inputted.

Next, the first user terminal 10a receives the approval screen information, and causes the display to display a screen (an image) shown in FIG. 12 based on the approval screen information having been received. In this exemplary embodiment, the screen shows that a service ID of a service (the second service) as a destination for provision of ID information is "blog" and an individual ID (the first individual ID) of a user as a target for the provision in a service (the first service) as a source of the provision of the ID information is "taro." Moreover, the screen may show a service ID of a service (the first service) as the source of the provision of the ID information, a common ID of a user as the target for the provision, and so on.

Assuming a case that the user of the first user terminal 10a performs an operation of pressing down the approval button, the description will be continued. In this case, the first user terminal 10a transmits approval information to the ID provision server device 30 (step M207).

Then, upon reception of the approval information, the ID provision server device 30 transmits approval case response information as response information including the first individual ID and the signature generated by using the private key unique to the first service, to the first user terminal 10a (step M208). This first individual ID is the first individual ID stored in the first ID information storing part 32 in association with the common ID included in the ID information provision request.

Upon reception of the approval case response information, the first user terminal 10a transmits a request to execute addition of correspondence, to the ID acquisition server device 40 (step M209). The request to execute addition of correspondence includes ID information. The ID information includes the first individual ID having been received, a service ID as information for identifying the first service, and the signature having been received.

Upon reception of the request to execute addition of correspondence, the ID acquisition server device 40 verifies the received signature, and thereafter, causes the storage device to store the received first individual ID, service ID and common ID in association with each other. After that, the ID acquisition server device 40 transmits information representing completion of the process to the first user terminal 10*a*.

Next, an operation of the ID provision server device 30 for the individual ID information registration process, and an operation of the ID acquisition server device 40 for the individual ID information registration process will be described, respectively.

<<Operation of ID Provision Server Device for Individual ID Information Registration Process>>

Figure 13:
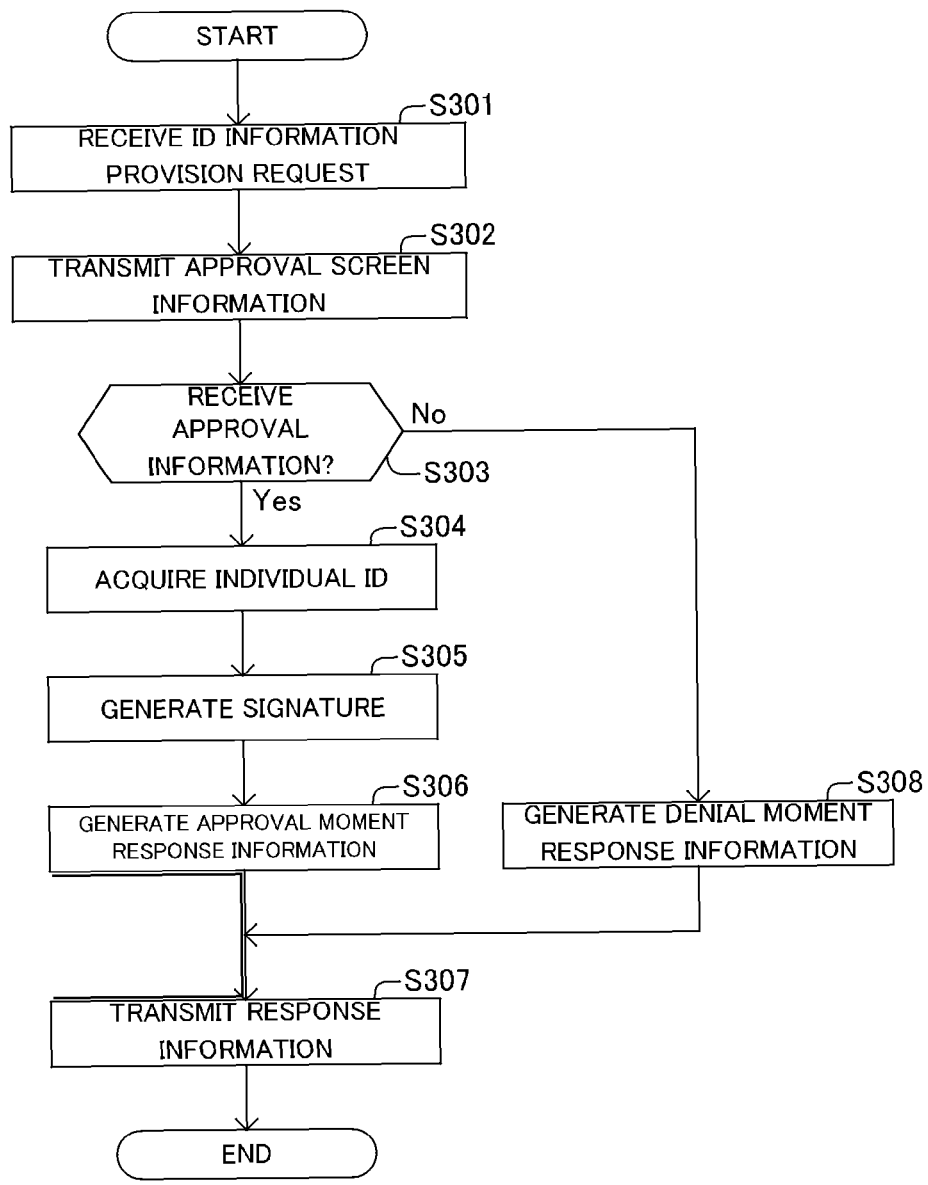
FIG. 13 is a flowchart showing an operation of the ID provision server device according to the first exemplary embodiment of the present invention, the operation relating to the individual ID information registration process.

With reference to a flowchart of FIG. 13, the operation of the ID provision server device 30 for the individual ID information registration process will be described.

At first, the ID provision server device 30 receives an ID information provision request from the first user terminal 10*a* (step S301). The ID information provision request includes a common ID (in this exemplary embodiment, "TanakaTaro") of a user (hereinafter, a requester) having performed an operation for transmitting the ID information provision request, a signature with respect to the common ID of the requester, and a service ID (in this exemplary embodiment, "blog") of a service as a destination for provision of ID information. The signature with respect to the common ID of the requester is the information generated by using the private key possessed by the authentication server device 20 in the user authentication process (FIG. 8).

As described above, upon reception of the ID information provision request, the ID provision server device 30 judges whether the common ID of the requester is valid (authenticate) by verifying the signature included in the ID information provision request. Verification of the signature is executed by judging whether a hash value calculated by applying a predetermined hash function to the common ID matches the result of decrypting of the signature using the public key of the authentication server device 20.

Below, assuming verification of the signature at this step has succeeded, the description will be continued. In a case that verification of the signature has failed, the ID provision server device 30 transmits response information representing that to the first user terminal 10*a*, and ends the process of this flowchart.

After success of verification of the signature, the ID provision server device 30 transmits approval screen information to the first user terminal 10*a* (step S302). After that, the ID provision server device 30 receives response information as a response by the user with respect to the approval screen, from the first user terminal 10*a*. Then, the ID provision server device 30 judges whether the received response information is approval information (step S303).

Assuming a case that the response information is the approval information (i.e., the approval button has been pressed down), the description will be continued. In this case, the ID provision server device 30 judges "Yes" and proceeds to step S304. Then, the ID provision server device 30 acquires the first individual ID (in this exemplary embodiment, "taro") stored in the first ID information storing part 32 in association with the common ID of the requester.

Next, with respect to the acquired first individual ID, the ID provision server device 30 generates a signature by using a private key unique to the first service (step S305). After that, the ID provision server device 30 creates approval case response information as response information that includes the acquired first individual ID and the generated signature (step S306). In this exemplary embodiment, the approval case response information includes screen information representing success of acquisition of an individual ID, an individual ID (the first individual ID; in this exemplary embodiment, "taro") of the requester, and a signature with respect to the individual ID of the requester.

Then, the ID provision server device 30 transmits the generated response information to the first user terminal 10*a* (step S307), and ends the process of this flowchart.

On the other hand, in a case that the response information is denial information (i.e., the denial button has been pressed down), the ID provision server device 30 judges "No" at step S303 and proceeds to step S308. Then, the ID provision server device 30 generates denial case response information as response information including screen information representing failure of acquisition of the individual ID. After that, the ID provision server device 30 proceeds to step S307.

<<Operation of ID Acquisition Server Device for Individual ID Information Registration Process>>

Figure 14:
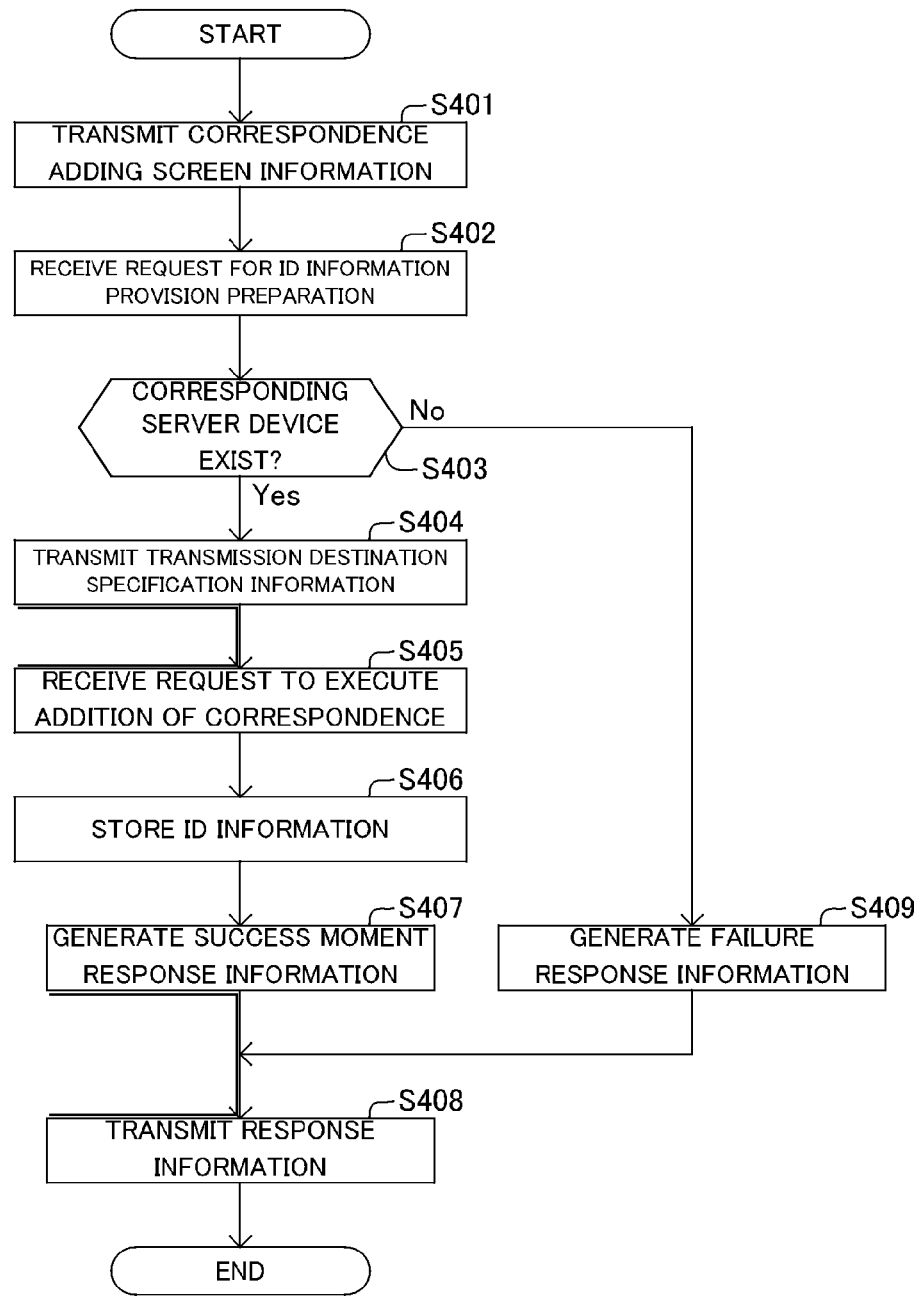
FIG. 14 is a flowchart showing an operation of the ID acquisition server device according to the first exemplary embodiment of the present invention, the operation relating to the individual ID information registration process.

With reference to a flowchart of FIG. 14, an operation of the ID acquisition server device 40 for the individual ID information registration process will be described.

At first, the ID acquisition server device 40 receives a request for correspondence adding screen information from the first user terminal 10*a*. As described above, authentication success information generated by the authentication server device 20 is added to a request for correspondence adding screen information. A user performing an operation for causing the first user terminal 10*a* to transmit the request for correspondence adding screen information is also called a requester. That is to say, the request for correspondence adding screen information includes a common ID (TanakaTaro) of the requester and a signature for the common ID of the requester.

Then, the ID acquisition server device 40 verifies the validity of the authentication success information having been received (i.e., performs verification of the signature for the common ID of the requester). The verification of the signature is also performed at steps S402 and S405.

Below, assuming the verification of the signature at each of the steps has succeeded, the description will be continued. In a case that the verification of the signature has failed, the ID acquisition server device 40 transmits response information representing that to the first user terminal 10*a*, and ends the process of this flowchart.

Then, the ID acquisition server device 40 transmits correspondence adding screen information that represents a correspondence adding screen including a service ID entry field and a transmission button, to the first user terminal 10*a* (step S401). This process corresponds to step M202 in FIG. 10.

Next, the ID acquisition server device 40 receives a request for ID information provision preparation from the first user terminal 10*a* (step S402). The request for ID information provision preparation includes the common ID (in this exemplary embodiment, "TanakaTaro") of the requester, the signature for the common ID of the requester, and a service ID (i.e., the service ID of a service as a source of provision of ID information (the first service); in this exemplary embodiment, "sns") inputted by the user of the first user terminal 10*a*. This process corresponds to step M203 in FIG. 10.

Then, the ID acquisition server device 40 judges whether a server device associated with the received service ID exists (step S403). In this exemplary embodiment, the received service ID is "sns." Moreover, as the server device associated with the service ID "sns," the ID provision server device 30 exists.

Therefore, the ID acquisition server device 40 judges "Yes," and proceeds to step S404 to transmit transmission destination specification information to the first user terminal 10*a* (step S404). The process of this step corresponds to step M204 in FIG. 10.

Further, the transmission destination specification information includes information for specifying the ID provision server device 30 as a destination for transmission of an ID information provision request. In this exemplary embodiment, the transmission destination specification information includes a status code representing HTTP Redirection, and URL.

After that, the ID acquisition server device 40 receives a request to execute addition of correspondence from the first user terminal 10*a* (step S405). The process at this step corresponds to step M209 in FIG. 10.

The request to execute addition of correspondence includes the common ID (in this exemplary embodiment, "TanakaTaro") of the requester, the signature for the common ID of the requester, the service ID (in this exemplary embodiment "sns") of a service (the first service) as a source of provision of ID information, an individual ID (in this exemplary embodiment, the first individual ID "taro") of the requester, and a signature for the individual ID of the requester. The signature for the individual ID of the requester is information generated by using a private key possessed by the ID provision server device 30.

Next, the ID acquisition server device 40 causes the storage device to store the first individual ID (in this exemplary embodiment, "taro") having been received, the service ID (in this exemplary embodiment, "sns") having been received, and the common ID (in this exemplary embodiment, "TanakaTaro") having been received, in association with each other (step S406). After that, the ID acquisition server device 40 generates success case response information as response information representing completion of the process (step S407). Then, the ID acquisition server device 40 transmits the generated response information to the first user terminal 10*a* (step S408).

In a case that a server device associated with the service ID included in the request for ID information provision preparation does not exist, the ID acquisition server device 40 judges "No" at step S403 and proceeds to step S409. Then, the ID acquisition server device 40 generates failure case response information as response information representing failure of the process. After that, the ID acquisition server device 40 proceeds to step S408.

<<ID Information Acquisition Process>>

Figure 15:
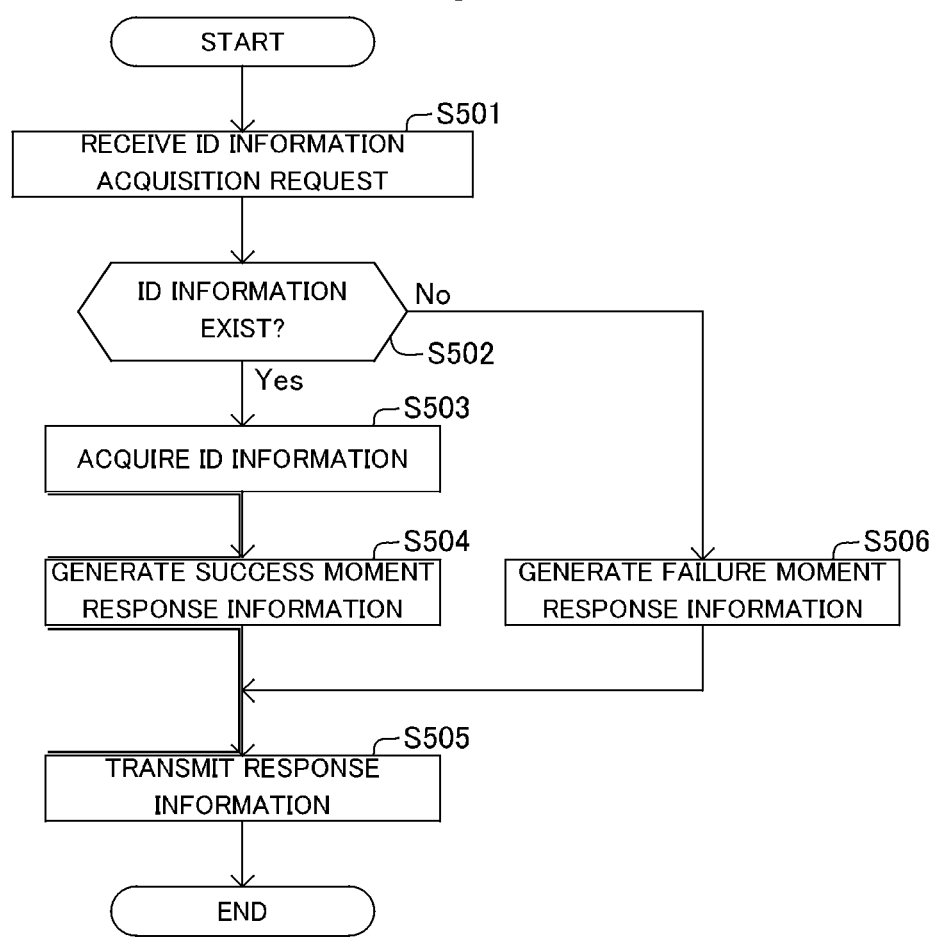
FIG. 15 is a flowchart showing an operation of the ID acquisition server device according to the first exemplary embodiment of the present invention, the operation relating to an ID information acquisition process.

With reference to a flowchart of FIG. 15, an operation of the ID acquisition server device 40 for the ID information acquisition process will be described.

At first, in accordance with information inputted by a user (a requester) of the second user terminal 10*b*, the second user terminal 10*b* transmits an ID information acquisition request to the ID acquisition server device 40. The ID information acquisition request includes a common ID (in this exemplary embodiment, "SuzukiHanako") of the requester, a signature for the common ID of the requester, and an individual ID (in this exemplary embodiment, the second individual ID "tanaka") of a target user in the second service.

The target user is a user who is different from the requester and who is an object for acquisition of ID information. Moreover, the signature for the common ID of the requester is the information generated by using the private key possessed by the authentication server device 20 in the user authentication process (FIG. 8).

In this exemplary embodiment, the individual ID of the target user included in the ID information acquisition request is information inputted by the user of the second user terminal 10*b*. The individual ID of the target user included in the ID information acquisition request may be information that the second user terminal 10*b* has received from the ID acquisition server device 40.

The ID acquisition server device 40 receives an ID information acquisition request to which authentication success information is added, from the second user terminal 10*b* (step S501). Then, the ID acquisition server device 40 verifies the validity of the received authentication success information (i.e., performs verification of the signature for the common ID of the requester).

Below, assuming the verification of the signature at this step has succeeded, the description will be continued. In a case that the verification of the signature has failed, the ID acquisition server device 40 transmits response information representing that to the second user terminal 10*b*, and ends the process of this flowchart.

Next, the ID acquisition server device 40 judges whether, in the records stored in the ID correspondence table storing part 46, a record which includes the same own individual ID as the individual ID (in this exemplary embodiment, the second individual ID "tanaka") of the target user included in the ID information acquisition request exists (step S502).

It is assumed that, in the records stored in the ID correspondence table storing part 46, a record which includes the same own individual ID as the individual ID (in this exemplary embodiment, the second individual ID "tanaka") of the target user included in the ID information acquisition request exists.

In this case, the ID acquisition server device 40 judges "Yes" and proceeds to step S503. Then, the ID acquisition server device 40 acquires, from among the records stored in the ID correspondence table storing part 46, a record which includes the same own individual ID as the individual ID (in this exemplary embodiment, the second individual ID "tanaka") of the target user included in the ID information acquisition request. Next, the ID acquisition server device 40 acquires another individual ID (in this exemplary embodiment, "taro") included in the acquired record and an external service ID (in this exemplary embodiment, "sns"), as ID information (step S503).

Then, the ID acquisition server device 40 generates success case response information as response information including the acquired ID information (step S504). Then, the ID acquisition server device 40 transmits the generated response information to the second user terminal 10*b* (step S505).

Thus, the second user terminal 10*b* receives the ID information from the ID acquisition server device 40. The second user terminal 10*b* outputs the received ID information (in this exemplary embodiment, "taro" and "sns") via the output device.

On the other hand, the following is a description of a case that, in the records stored in the ID correspondence table storing part 46, a record including the same own individual ID as the individual ID of the target user included in the ID information acquisition request does not exist. In this case, the ID acquisition server device 40 judges "No" at step S502 and proceeds to step S506. Then, the ID acquisition server device 40 generates failure case response information as response information representing failure of the process. After that, the ID acquisition server device 40 proceeds to step S505.

As described above, according to the service providing system according to the first exemplary embodiment of the present invention, it is possible to allow other users to judge the identity of a user to whom different IDs (in this exemplary embodiment, the first individual ID and the second individual ID) depending on the respective services are assigned, without previously executing a process (e.g., a process of causing a service provider to issue a consumer key and a consumer secret and transmitting them to a consumer).

Further, in the service providing system according to the first exemplary embodiment, when receiving a service ID, a first individual ID and a common ID, the ID acquisition server device 40 causes the storage device to store the received service ID, first individual ID and common ID in association with each other.

According to this, when receiving an ID information acquisition request, the ID acquisition server device 40 can speedily transmit the service ID and the first individual ID to the second user terminal 10*b*.

The service providing system according to the first exemplary embodiment is configured to provide the first individual ID possessed (held) by the ID provision server device 30 to the ID acquisition server device 40 via the first user terminal 10*a*, but may be configured to also provide information (profile information) representing the attributes (e.g., name, date of birth, gender, height, weight, and so on) of the user, in addition to the first individual ID.

Second Exemplary Embodiment

Next, an information processing system according to a second exemplary embodiment of the present invention will be described. The information processing system according to the second exemplary embodiment is different from the information processing system according to the first exemplary embodiment in being configured so as to be capable of setting a user permitted as a destination for transmission of ID information. Therefore, a description will be made below focusing on the different point.

Figure 16:
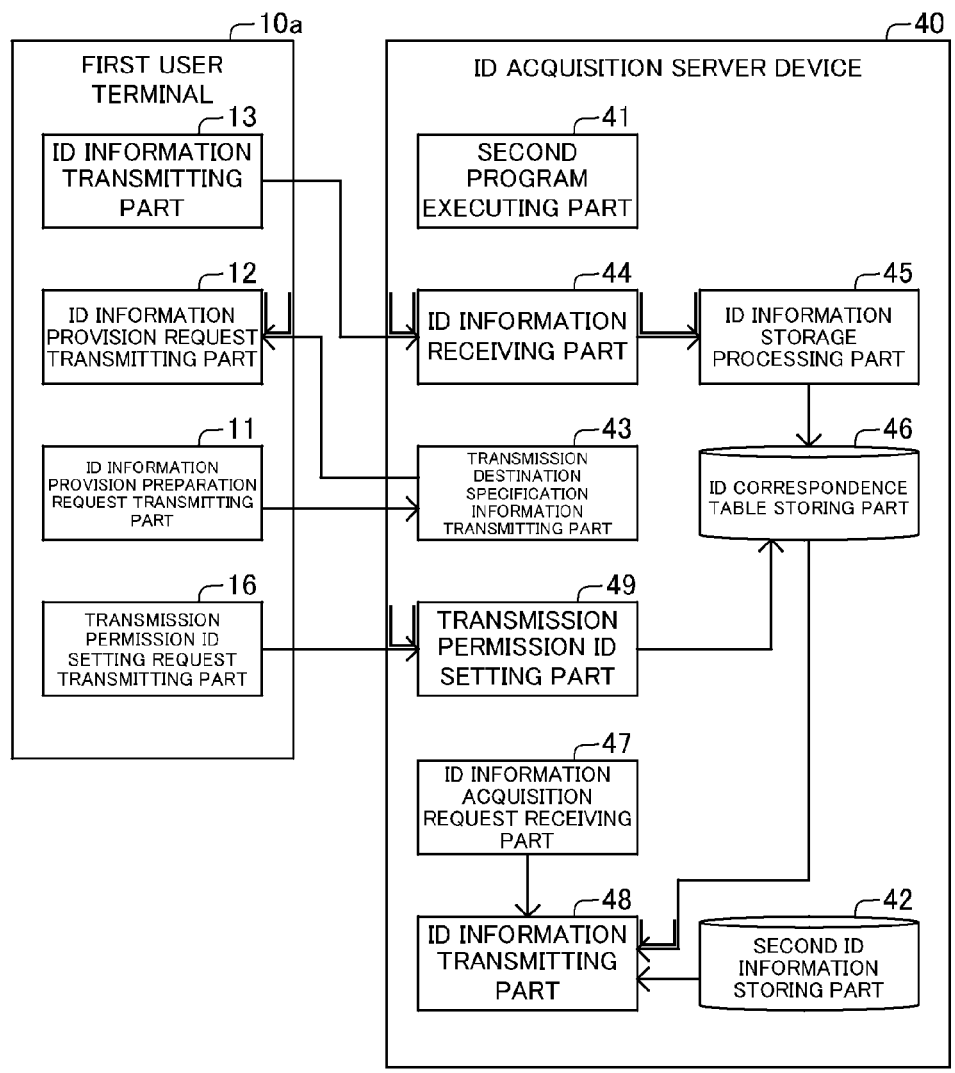
FIG. 16 is a schematic block diagram showing a function of an information processing system according to a second exemplary embodiment of the present invention.

As shown in FIG. 16, the functions of the first user terminal 10*a* in the second exemplary embodiment include a transmission permission ID setting request transmitting part 16, in addition to the functions in the first exemplary embodiment.

Moreover, the functions of the ID acquisition server device 40 in the second exemplary embodiment include a transmission permission ID setting part (a transmission permission ID setting means) 49, in addition to the functions in the first exemplary embodiment.

The ID correspondence table storing part (a transmission permission ID storing means) 46 in the second exemplary embodiment stores, in association with a service ID, a first individual ID and a second individual ID, a transmission permission ID (in this exemplary embodiment, the second individual ID) for identifying a user permitted as a destination for transmission of the first individual ID and the service ID.

In this exemplary embodiment, as shown in FIG. 17, the ID correspondence table storing part 46 stores a plurality of records each composed of a record ID, an own individual ID, an external service ID, another individual ID, and a transmission permission ID.

Among the records shown in FIG. 17, a record whose record ID is "1" represents that a user identified by an own individual ID (a second individual ID) "suzuki" in an own service (in this exemplary embodiment, a second service) is identified by another individual ID (a first individual ID) "hanako" in a first service "sns" of an external service. Moreover, this record represents that ID information (the first individual ID and the service ID) is transmitted only in response to an ID information acquisition request transmitted by a user identified by a transmission permission ID (in this exemplary embodiment, "tanaka" and "yamada").

Further, the ID information transmitting part 48 of the ID acquisition server device 40 in the second exemplary embodiment extracts records including the same own individual ID as the second individual ID included in the ID information acquisition request, from among the records stored in the ID correspondence table storing part 46. Then, the ID information transmitting part 48 acquires a record in which a transmission permission ID includes the second individual ID stored in the second ID information storing part 42 in association with the common ID included in the ID information acquisition request, from among the extracted records.

Next, the ID information transmitting part 48 transmits ID information including the service ID (the external service ID) and the first individual ID (the other individual ID) included in the acquired record, to the user terminal (in this exemplary embodiment, the second user terminal 10*b*) having transmitted the ID information acquisition request.

That is to say, in a case that the transmission permission ID stored in association with the same second individual ID as the second individual ID included in the ID information acquisition request includes a second individual ID associated with a common ID included in the ID information acquisition request, the ID information transmitting part 48 transmits a service ID and a first individual ID stored in association with the transmission permission ID.

In accordance with information inputted by the user of the first user terminal 10*a*, the transmission permission ID setting request transmitting part 16 of the first user terminal 10*a* transmits a transmission permission ID setting request to the ID acquisition server device 40.

The transmission permission ID setting request is a batch setting request or an individual setting request.

A batch setting request includes a common ID of a requester (i.e., a user having performed an operation for transmitting a transmission permission ID setting request), a signature for the common ID of the requester, and request type information representing that the type of the request is batch setting.

An individual setting request includes a common ID of a requester, a signature for the common ID of the requester, request type information representing that the type of the request is individual setting, a service ID as a target for setting a transmission permission ID, an addition individual ID (in this exemplary embodiment, the second individual ID) as an individual ID added to the transmission permission ID, and a deletion individual ID (in this exemplary embodiment, the second individual ID) as an individual ID deleted from the transmission permission ID.

The transmission permission ID setting part 49 of the ID acquisition server device 40 receives the transmission permission ID setting request from the first user terminal 10*a*.

In a case that the transmission permission ID setting request having been received is a batch setting request, the transmission permission ID setting part 49 extracts records including a transmission permission ID including the second individual ID stored in the second ID information storing part 42 in association with the common ID included in the batch setting request, from among the records stored in the ID correspondence table storing part 46. Then, the transmission permission ID setting part 49 acquires a combination of an own individual ID (in this exemplary embodiment, the second individual ID) and external service ID included in the extracted record.

Next, the transmission permission ID setting part 49 executes a transmission permission ID update process for updating a transmission permission ID, on each combination of own individual ID and external service ID having been acquired. As part of the transmission permission ID update process, the transmission permission ID setting part 49 firstly specifies a record which includes the same own individual ID (in this exemplary embodiment, the second individual ID) as the second individual ID stored in the second ID information storing part 42 in association with the common ID included in the batch setting request and which also includes an external service ID as a target for the transmission permission ID update process, from among the records stored in the ID correspondence table storing part 46.

Further, as part of the transmission permission ID update process, the transmission permission ID setting part 49 adds an own individual ID as the target for the transmission permission ID update process, to a transmission ID included in the specified record. Thus, the transmission permission ID setting part 49 updates the transmission permission ID based on the batch setting request.

According to this, the user can easily set a transmission permission ID.

In other words, upon reception of the batch setting request, the transmission permission ID setting part 49 extracts the second individual ID stored in association with the transmission permission ID including the second individual ID associated with the common ID included in the batch setting request. Moreover, the transmission permission ID setting part 49 updates the transmission permission ID stored in association with the second individual ID associated with the common ID included in the batch setting request, to a transmission permission ID including the extracted second individual ID.

In other words, it can be said that the batch setting request is information of a request for setting a transmission permission ID so as to permit a user permitting a requester to transmit ID information, to transmit the ID information of the requester.

Further, in a case that the transmission permission ID setting request having been received is an individual setting request, the transmission permission ID setting part 49 specifies a record which includes a service ID as a target for setting a transmission permission ID included in the individual setting request and includes the same own individual ID as the second individual ID associated with the common ID included in the individual setting request, from among the records stored in the ID correspondence table storing part 46.

Then, the transmission permission ID setting part 49 adds an addition individual ID included in the individual setting request to a transmission ID included in the specified record. Moreover, the transmission permission ID setting part 49 deletes a deletion individual ID included in the individual setting request from the transmission permission ID included in the specified record.

<<Transmission Permission ID Setting Process>>

Figure 18:
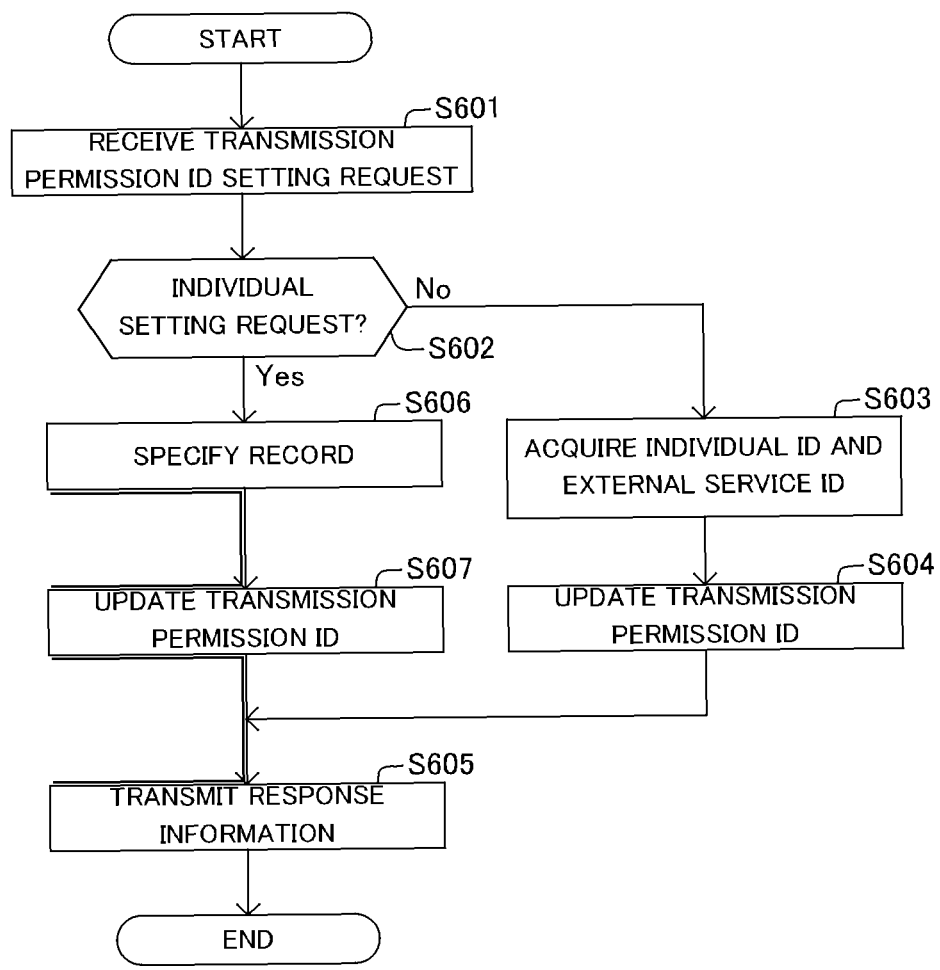
FIG. 18 is a flowchart showing an operation of the ID acquisition server device according to the second exemplary embodiment of the present invention, the operation relating to a transmission permission ID setting process.

With reference to a flowchart of FIG. 18, an operation of the ID acquisition server device 40 for a transmission permission ID setting process will be described.

At first, the first user terminal 10*a* transmits a transmission permission ID setting request to the ID acquisition server device 40 in accordance with information inputted by a user (a requester) of the first user terminal 10*a*. Consequently, the ID acquisition server device 40 receives the transmission permission ID setting request (step S601).

Then, the ID acquisition server device 40 verifies the validity of the authentication success information having been received (i.e., performs verification of a signature for a common ID of the requester).

Below, assuming the verification of the signature at this step has succeeded, the description will be continued. In a case that the verification of the signature has failed, the ID acquisition server device 40 transmits response information representing that to the first user terminal 10*a*, and ends the process of this flowchart.

Next, the ID acquisition server device 40 judges whether the transmission permission ID setting request having been received is an individual setting request (step S602).

It is assumed that a batch setting request has been transmitted as the transmission permission ID setting request. Moreover, a case that the batch setting request includes "TanakaTaro" as the common ID of the requester is assumed. In this case, the ID acquisition server device 40 judges "No" and proceeds to step S603.

Then, the ID acquisition server device 40 extracts a record including a transmission permission ID including a second individual ID (in this exemplary embodiment, "tanaka") stored in the second ID information storing part 42 in association with the common ID (in this exemplary embodiment, "TanakaTaro") included in the batch setting request, from among the records stored in the ID correspondence table storing part 46. Therefore, in this exemplary embodiment, the ID acquisition server device 40 extracts a record whose record ID is "1" and a record whose record ID is "3" from among the records shown in FIG. 17.

Further, the ID acquisition server device 40 acquires a combination of an own individual ID (in this exemplary embodiment, the second individual ID) and an external service ID that are included in the extracted record (step S603). Therefore, in this exemplary embodiment, the ID acquisition server device 40 acquires a combination of an own individual ID "suzuki" and an external service ID "sns" and a combination of an own individual ID "yamada" and an external service ID "sns."

Next, the ID acquisition server device 40 executes a transmission permission ID update process for updating the transmission permission ID, on each of the acquired combinations of own individual IDs and external service IDs.

To be specific, the ID acquisition server device 40 firstly specifies a record which includes the same own individual ID (in this exemplary embodiment, the second individual ID) as the second individual ID stored in the second ID information storing part 42 in association with the common ID included in the batch setting request and which also includes an external service ID as a target for the transmission permission ID update process, from among the records stored in the ID correspondence table storing part 46, as part of the transmission permission ID update process.

Then, the ID acquisition server device 40 adds an own individual ID of a target for the transmission permission ID update process, to the transmission permission ID included in the specified record, as part of the transmission permission ID update process.

Thus, the ID acquisition server device 40 updates the transmission permission ID based on the batch setting request (step S604). Therefore, in this exemplary embodiment, as shown in FIG. 19, the ID acquisition server device 40 adds "suzuki" and "yamada" to the transmission permission ID included in the record whose record ID is "2."

Then, the ID acquisition server device 40 transmits response information representing completion of the process, to the user terminal (in this exemplary embodiment, the first user terminal 10*a*) having transmitted the transmission permission ID setting request (step S605).

On the other hand, it is assumed that an individual setting request has been transmitted as the transmission permission ID setting request. Moreover, a case that the individual setting request includes "TanakaTaro" as the common ID of the requester, "sns" as the service ID of the target for setting the transmission permission ID, and "yamada" as an addition individual ID is assumed. In this case, the ID acquisition server device 40 judges "Yes" at step S602 and proceeds to step S606.

Then, the ID acquisition server device 40 specifies a record which includes the service ID (in this exemplary embodiment, "sns") as the target for setting the transmission permission ID included in the individual setting request and which also includes the same own individual ID as the second individual ID (in this exemplary embodiment, "tanaka") associated with the common ID (in this exemplary embodiment, "TanakaTaro") included in the individual setting request, from among the records stored in the ID correspondence table storing part 46 (step S606). Therefore, in this exemplary embodiment, the ID acquisition server device 40 specifies a record whose record ID is "2," from among the records shown in FIG. 17.

Next, the ID acquisition server device 40 adds the addition individual ID included in the individual setting request to the transmission permission ID included in the specified record. Moreover, the ID acquisition server device 40 deletes a deletion individual ID included in the individual setting request, from the transmission permission ID included in the specified record. Therefore, in this exemplary embodiment, as shown in FIG. 20, the ID acquisition server device 40 adds "yamada" to the transmission permission ID included in the record whose record ID is "2."

Thus, the ID acquisition server device 40 updates the transmission permission ID based on the individual setting request (step S607).

Then, the ID acquisition server device 40 transmits response information representing completion of the process to the user terminal (in this exemplary embodiment, the first user terminal 10a) having transmitted the transmission permission ID setting request (step S605).

As described above, the service providing system according to the second exemplary embodiment of the present invention can produce the same actions and effects as the service providing system according to the first exemplary embodiment.

Moreover, the service providing system according to the second exemplary embodiment allows setting of a user permitted as a destination that the ID acquisition server device 40 transmits ID information.

As a result, it is possible to cause only a specific user to judge whether a user identified by a first individual ID is identical to a user identified by a second individual ID, for each combination of a service and a user. Therefore, it is possible to increase the convenience for users.

Third Exemplary Embodiment

Figure 21:
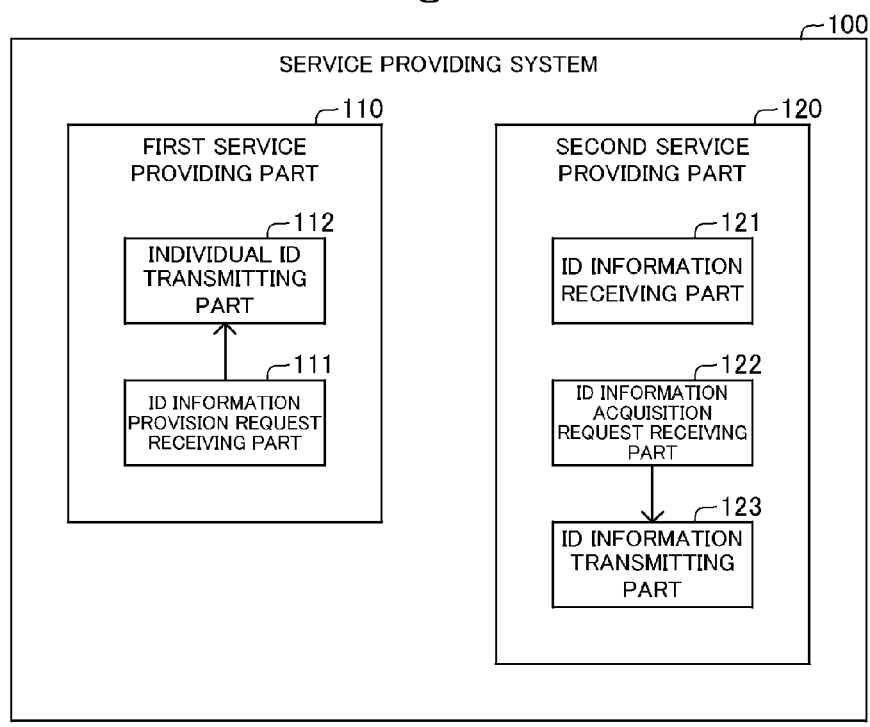
FIG. 21 is a schematic block diagram showing a function of a service providing system according to a third exemplary embodiment of the present invention.

Next, a service providing system according to a third exemplary embodiment of the present invention will be described with reference to FIG. 21.

A service providing system 100 according to the third exemplary embodiment includes:
a first service providing part (a first service providing means) 110 for providing a first service by executing a first application program; and
a second service providing part (a second service providing means) 120 for providing a second service by executing a second application program.

The first service providing part 110 includes:
an ID information provision request receiving part (an ID information provision request receiving means) 111 for receiving, from a user terminal, an ID information provision request including a common ID that is information common to the first service and the second service and that is information for identifying a user; and
an individual ID transmitting part (an individual ID transmitting means) 112 for transmitting, to the user terminal having transmitted the ID information provision request, a first individual ID that is information associated with the common ID included in the ID information provision request and that is information for identifying a user in the first service.

The second service providing part 120 includes:
an ID information receiving part (an ID information receiving means) 121 for receiving, from the user terminal, a service ID that is information for identifying the first service, the first individual ID, and the common ID;
an ID information acquisition request receiving part (an ID information acquisition request receiving means) 122 for receiving, from a user terminal, an ID information acquisition request including a second individual ID that is information for identifying a user in the second service; and
an ID information transmitting part (an ID information transmitting means) 123 for transmitting, to the user terminal having transmitted the ID information acquisition request, the service ID and the first individual ID that have been received with the common ID associated with the second individual ID included in the ID information acquisition request.

Accordingly, it is possible to cause other users to judge the identity of a user to whom a different ID depending on each of a plurality of services is assigned, without previously performing a process (e.g., a process of causing a service provider to issue a consumer key and a consumer secret and transmitting them to a consumer).

Although the present invention has been described below with reference to the above exemplary embodiments, the present invention is not limited to the exemplary embodiments described above. It is possible to alter the configurations and details of the present invention in various manners that can be understood by those skilled in the art within the scope of the present invention.

The respective functions of the service providing systems in the respective exemplary embodiments are realized by execution of a program (software) by the CPU, but may be realized by hardware such as circuit.

Further, the program is stored in the storage device in the respective exemplary embodiments, but may be stored in a computer-readable recording medium. For example, the recording medium is a portable medium such as a flexible disk, an optical disk, a magnet-optical disk and a semiconductor memory.

Further, a modified example of the exemplary embodiments, any combination of the abovementioned exemplary embodiments and modified examples may be employed.

[Supplementary Notes]

The whole or part of the exemplary embodiments disclosed above can be described as, but not limited to, the following supplementary notes.

(Supplementary Note 1)

A service providing system, comprising:
a first service providing means for providing a first service by executing a first application program; and
a second service providing means for providing a second service by executing a second application program, wherein the first service providing means includes:
an ID information provision request receiving means for receiving, from a user terminal, an ID information provision request including a common ID that is information common to the first service and the second service and that is information for identifying a user; and
an individual ID transmitting means for transmitting, to the user terminal having transmitted the ID information provision request, a first individual ID that is information associated with the common ID included in the ID information provision request and that is information for identifying a user in the first service, and
wherein the second service providing means includes:
an ID information receiving means for receiving, from the user terminal, a service ID that is information for identifying the first service, the first individual ID, and the common ID;
an ID information acquisition request receiving means for receiving, from a user terminal, an ID information acquisition request including a second individual ID that is information for identifying a user in the second service; and
an ID information transmitting means for transmitting, to the user terminal having transmitted the ID information acquisition request, the service ID and the first individual ID that have been received with the common ID associated with the second individual ID included in the ID information acquisition request.

Accordingly, it is possible to cause other users to judge the identity of a user to whom a different ID depending on each of a plurality of services is assigned, without previously executing a process (e.g., a process of causing a service provider to issue a consumer key and a consumer secret and transmitting them to a consumer).

(Supplementary Note 2)

The service providing system according to Supplementary Note 1, wherein:
the second service providing means includes an ID information storage processing means for, when receiving the service ID, the first individual ID and the common ID, causing a storage device to store the service ID and the first individual ID that have been received and the second individual ID associated with the received common ID, in association with each other; and
the ID information transmitting means is configured to transmit the service ID and the first individual ID that are stored in the storage device in association with a same second individual ID as the second individual ID included in the ID information acquisition request.

Accordingly, in the case of receiving an ID information acquisition request, the second service providing means can speedily transmit a service ID and a first individual ID to a user terminal.

(Supplementary Note 3)

The service providing system according to Supplementary Note 2, wherein:
the ID information acquisition request includes the common ID;
the second service providing means includes a transmission permission ID storing means for storing a transmission permission ID for identifying a user permitted as a destination for transmission of the first individual ID, in association with the service ID, the first individual ID and the second individual ID; and
the ID information transmitting means is configured to, in a case that a transmission permission ID stored in association with the same second individual ID as the second individual ID included in the ID information acquisition request includes the second individual ID associated with the common ID included in the ID information acquisition request, transmit the service ID and the first individual ID that are stored in association with the transmission permission ID.

Accordingly, it is possible to set a user permitted as a destination that the second service providing means transmits a first individual ID. As a result, it is possible to cause only a specific user to judge whether a user identified by a first individual ID is identical to a user identified by a second individual ID, for each combination of a service and a user. Therefore, it is possible to increase the convenience for users.

(Supplementary Note 4)

The service providing system according to Supplementary Note 3, wherein the second service providing means includes a transmission permission ID setting means for, when receiving a batch setting request including a common ID from a user terminal, extracting a second individual ID stored in association with a transmission permission ID including the second individual ID associated with the common ID included in the batch setting request, and updating a transmission permission ID stored in association with the second individual ID associated with the common ID included in the batch setting request, to a transmission permission ID including the extracted second individual ID.

Accordingly, a user can easily set a transmission permission ID.

(Supplementary Note 5)

The service providing system according to any of Supplementary Notes 1 to 4, wherein the second service providing means includes a transmission destination specification information transmitting means for, when receiving an ID information provision preparation request including a service ID from a user terminal, transmitting transmission destination specification information for specifying a destination for transmission of the ID information provision request associated with a service identified by the service ID included in the ID information provision preparation request, to the user terminal.

(Supplementary Note 6)

The service providing system according to any of Supplementary Notes 1 to 5, wherein:
the first service providing means includes a first ID information storing means for storing the common ID and the first individual ID in association with each other; and
the second service providing means includes a second ID information storing means for storing the common ID and the second individual ID in association with each other.

(Supplementary Note 7)

A service providing method applied to a service providing system configured to provide a first service by executing a first application program and provide a second service by executing a second application program, the service providing method comprising:
receiving, from a user terminal, an ID information provision request including a common ID that is information common to the first service and the second service and that is information for identifying a user;
transmitting, to the user terminal having transmitted the ID information provision request, a first individual ID that is information associated with the common ID included in the ID information provision request and that is information for identifying a user in the first service;
receiving, from the user terminal, a service ID that is information for identifying the first service, the first individual ID, and the common ID;

receiving, from a user terminal, an ID information acquisition request including a second individual ID that is information for identifying a user in the second service; and transmitting, to the user terminal having transmitted the ID information acquisition request, the service ID and the first individual ID that have been received with the common ID associated with the second individual ID included in the ID information acquisition request.

(Supplementary Note 8)

The service providing method according to Supplementary Note 7, comprising:

when receiving the service ID, the first individual ID and the common ID, causing a storage device to store the service ID and the first individual ID that have been received and the second individual ID associated with the received common ID, in association with each other; and transmitting the service ID and the first individual ID that are stored in the storage device in association with a same second individual ID as the second individual ID included in the ID information acquisition request, to the user terminal having transmitted the ID information acquisition request.

(Supplementary Note 9)

An ID provision server device configured to provide a first service by executing a first application program, the ID provision server device comprising:

an ID information provision request receiving means for receiving, from a user terminal, an ID information provision request including a common ID that is information common to the first service and a second service provided by an ID acquisition server device and that is information for identifying a user; and an individual ID transmitting means for transmitting, to the user terminal having transmitted the ID information provision request, a first individual ID that is information associated with the common ID included in the ID information provision request and that is information for identifying a user in the first service.

(Supplementary Note 10)

An ID provision program comprising instructions for causing an information processing device configured to provide a first service by executing a first application program, to realize;

an ID information provision request receiving means for receiving, from a user terminal, an ID information provision request including a common ID that is information common to the first service and a second service provided by an ID acquisition server device and that is information for identifying a user; and an individual ID transmitting means for transmitting, to the user terminal having transmitted the ID information provision request, a first individual ID that is information associated with the common ID included in the ID information provision request and that is information for identifying a user in the first service.

(Supplementary Note 11)

An ID acquisition server device configured to provide a second service by executing a second application program, the ID acquisition server device comprising:

an ID information receiving means for receiving, from a user terminal, a service ID that is information for identifying a first service provided by an ID provision server device, a first individual ID that is information for identifying a user in the first service, and a common ID that is information common to the first service and the second service and that is information for identifying a user;

an ID information acquisition request receiving means for receiving, from a user terminal, an ID information acquisition request including a second individual ID that is information for identifying a user in the second service; and an ID information transmitting means for transmitting, to the user terminal having transmitted the ID information acquisition request, the service ID and the first individual ID that have been received with the common ID associated with the second individual ID included in the ID information acquisition request.

(Supplementary Note 12)

The ID acquisition server device according to Supplementary Note 11, comprising an ID information storage processing means for, when receiving the service ID, the first individual ID and the common ID, causing a storage device to store the service ID and the first individual ID that have been received and the second individual ID associated with the received common ID, in association with each other, wherein the ID information transmitting means is configured to transmit the service ID and the first individual ID that are stored in the storage device in association with a same second individual ID as the second individual ID included in the ID information acquisition request.

(Supplementary Note 13)

An ID acquisition program comprising instructions for causing an information processing device configured to provide a second service by executing a second application program, to realize:

an ID information receiving means for receiving, from a user terminal, a service ID that is information for identifying a first service provided by an ID provision server device, a first individual ID that is information for identifying a user in the first service, and a common ID that is information common to the first service and the second service and that is information for identifying a user;

an ID information acquisition request receiving means for receiving, from a user terminal, an ID information acquisition request including a second individual ID that is information for identifying a user in the second service; and an ID information transmitting means for transmitting, to the user terminal having transmitted the ID information acquisition request, the service ID and the first individual ID that have been received with the common ID associated with the second individual ID included in the ID information acquisition request.

(Supplementary Note 14)

The ID acquisition program according to Supplementary Note 13, further comprising instructions for causing the information processing device to realize an ID information storage processing means for, when receiving the service ID, the first individual ID and the common ID, causing a storage device to store the service ID and the first individual ID that have been received and the second individual ID associated with the received common ID, in association with each other wherein the ID information transmitting means is configured to transmit the service ID and the first individual ID that are stored in the storage device in association with a same second individual ID as the second individual ID included in the ID information acquisition request.

The present invention is based upon and claims the benefit of priority from Japanese patent application No. 2010-156280, filed on Jul. 9, 2010, the disclosure of which is incorporated herein in its entirety by reference.

INDUSTRIAL APPLICABILITY

The present invention can be applied to, for example, a service providing system that provides a plurality of services.

DESCRIPTION OF REFERENCE NUMERALS 1 information processing system
10a first user terminal
10b second user terminal
11 ID information provision preparation request transmitting part
12 ID information provision request transmitting part
13 ID information transmitting part
14 ID information acquisition request transmitting part
15 ID information receiving part
16 transmission permission ID setting request transmitting part
20 authentication server device
30 ID provision server device
31 first program executing part
32 first ID information storing part
33 ID information provision request receiving part
34 individual ID transmitting part
40 ID acquisition server device
41 second program executing part
42 second ID information storing part
43 transmission destination specification information transmitting part
44 ID information receiving part
45 ID information storage processing part
46 ID correspondence table storing part
47 ID information acquisition request receiving part
48 ID information transmitting part
49 transmission permission ID setting part
100 service providing system
110 first service providing part
111 ID information provision request receiving part
112 individual ID transmitting part
120 second service providing part
121 ID information receiving part
122 ID information acquisition request receiving part
123 ID information transmitting part
NW communication network

The invention claimed is:

1. A service providing system, comprising:
a first service providing unit for providing a first service by executing a first application program; and
a second service providing unit for providing a second service by executing a second application program,
wherein the first service providing unit includes:
an ID information provision request receiving unit for receiving, an ID information provision request including a common ID that is information common to the first service and the second service and that is information for identifying a user, from a user terminal having transmitted the ID information provision request; and
an individual ID transmitting unit for transmitting, to the user terminal having transmitted the ID information provision request, a first individual ID that is information associated with the common ID included in the ID information provision request and that is information for identifying a user in the first service, and
wherein the second service providing unit includes:
an ID information receiving unit for receiving, from the user terminal having transmitted the ID information provision request to the first service providing unit, a service ID that is information for identifying the first service, the first individual ID, and the common ID;
an ID information acquisition request receiving unit for receiving, an ID information acquisition request including a second individual ID that is information for identifying a user in the second service, from a user terminal having transmitted the ID information acquisition request;
an ID information transmitting unit for transmitting, to the user terminal having transmitted the ID information acquisition request, the service ID and the first individual ID that have been received with the common ID associated with the second individual ID included in the ID information acquisition request; and
an ID information storage processing unit for, when receiving the service ID, the first individual ID and the common ID, causing a storage device to store the service ID and the first individual ID that have been received and the second individual ID associated with the received common ID, in association with each other; wherein,
the ID information transmitting unit is configured to transmit the service ID and the first individual ID that are stored in the storage device in association with a same second individual ID as the second individual ID included in the ID information acquisition request; and further,
the ID information acquisition request includes the common ID;
the second service providing unit includes a transmission permission ID storing unit for storing a transmission permission ID for identifying a user permitted as a destination for transmission of the first individual ID, in association with the service ID, the first individual ID and the second individual ID; and
the ID information transmitting unit is configured to, in a case that a transmission permission ID stored in association with the same second individual ID as the second individual ID included in the ID information acquisition request includes the second individual ID associated with the common ID included in the ID information acquisition request, transmit the service ID and the first individual ID that are stored in association with the transmission permission ID.

2. The service providing system according to claim 1, wherein the second service providing unit includes a transmission permission ID setting unit for, when receiving a batch setting request including a common ID from a user terminal, extracting a second individual ID stored in association with a transmission permission ID including the second individual ID associated with the common ID included in the batch setting request, and updating a transmission permission ID stored in association with the second individual ID associated with the common ID included in the batch setting request, to a transmission permission ID including the extracted second individual ID.

3. The service providing system according to claim 1, wherein:
the first service providing unit includes a first ID information storing unit for storing the common ID and the first individual ID in association with each other; and
the second service providing unit includes a second ID information storing unit for storing the common ID and the second individual ID in association with each other.

4. A service providing system, comprising:
a first service providing unit for providing a first service by executing a first application program; and
a second service providing unit for providing a second service by executing a second application program,
wherein the first service providing unit includes:
an ID information provision request receiving unit for receiving, an ID information provision request including a common ID that is information common to the first service and the second service and that is information for identifying a user, from a user terminal having transmitted the ID information provision request; and an individual ID transmitting unit for transmitting, to the user terminal having transmitted the ID information provision request, a first individual ID that is information associated with the common ID included in the ID information provision request and that is information for identifying a user in the first service, and wherein the second service providing unit includes:

an ID information receiving unit for receiving, from the user terminal having transmitted the ID information provision request to the first service providing unit, a service ID that is information for identifying the first service, the first individual ID, and the common ID;

an ID information acquisition request receiving unit for receiving, an ID information acquisition request including a second individual ID that is information for identifying a user in the second service, from a user terminal having transmitted the ID information acquisition request;

an ID information transmitting unit for transmitting, to the user terminal having transmitted the ID information acquisition request, the service ID and the first individual ID that have been received with the common ID associated with the second individual ID included in the ID information acquisition request; and a transmission destination specification information transmitting unit for, when receiving an ID information provision preparation request including a service ID from a user terminal, transmitting transmission destination specification information for specifying a destination for transmission of the ID information provision request associated with a service identified by the service ID included in the ID information provision preparation request, to the user terminal.

5. A service providing method applied to a service providing system configured to provide a first service by executing a first application program and provide a second service by executing a second application program, the service providing method comprising:

receiving an ID information provision request including a common ID that is information common to the first service and the second service and that is information for identifying a user, from a user terminal having transmitted the ID information provision request;

transmitting, to the user terminal having transmitted the ID information provision request, a first individual ID that is information associated with the common ID included in the ID information provision request and that is information for identifying a user in the first service;

receiving, from the user terminal having transmitted the ID information provision request, a service ID that is information for identifying the first service, the first individual ID, and the common ID;

receiving an ID information acquisition request including a second individual ID that is information for identifying a user in the second service, from a user terminal having transmitted the ID information acquisition request; and transmitting, to the user terminal having transmitted the ID information acquisition request, the service ID and the first individual ID that have been received with the common ID associated with the second individual ID included in the ID information acquisition request; and causing a storage device to store the service ID and the first individual ID that have been received and the second individual ID associated with the received common ID, in association with each other, when receiving the service ID, the first individual ID and the common ID;

wherein, the service ID and the first individual ID that are stored in the storage device in association are transmitted with a same second individual ID as the second individual ID included in the ID information acquisition request;

the ID information acquisition request includes the common ID;

storing a transmission permission ID for identifying a user permitted as a destination for transmission of the first individual ID, in association with the service ID, the first individual ID and the second individual ID; and in a case that a transmission permission ID stored in association with the same second individual ID as the second individual ID included in the ID information acquisition request includes the second individual ID associated with the common ID included in the ID information acquisition request, transmitting the service ID and the first individual ID that are stored in association with the transmission permission ID.

6. The service providing method according to claim 5, comprising:

when receiving the service ID, the first individual ID and the common ID, causing a storage device to store the service ID and the first individual ID that have been received and the second individual ID associated with the received common ID, in association with each other; and transmitting the service ID and the first individual ID that are stored in the storage device in association with a same second individual ID as the second individual ID included in the ID information acquisition request, to the user terminal having transmitted the ID information acquisition request.

* * * * *